United States Patent
Nefzger et al.

(10) Patent No.: US 12,209,373 B2
(45) Date of Patent: Jan. 28, 2025

(54) IMPLEMENT FOR SKID STEER VEHICLE

(71) Applicant: Ariens Company, Brillion, WI (US)

(72) Inventors: Harley Nefzger, Monticello, WI (US); Dean Mish, Potosi, WI (US); Mark Nier, Kiel, WI (US)

(73) Assignee: Ariens Company, Brillion, WI (US)

( * ) Notice: Subject to any disclaimer, the term of this patent is extended or adjusted under 35 U.S.C. 154(b) by 0 days.

(21) Appl. No.: 18/715,648

(22) PCT Filed: Dec. 1, 2022

(86) PCT No.: PCT/US2022/080762
§ 371 (c)(1),
(2) Date: May 31, 2024

(87) PCT Pub. No.: WO2023/102486
PCT Pub. Date: Jun. 8, 2023

(65) Prior Publication Data
US 2024/0417942 A1     Dec. 19, 2024

Related U.S. Application Data

(60) Provisional application No. 63/285,877, filed on Dec. 3, 2021.

(30) Foreign Application Priority Data

Dec. 4, 2021   (CA) .................... CA 3141241

(51) Int. Cl.
*E02F 3/36*     (2006.01)
*E01H 5/06*     (2006.01)
*E01H 5/09*     (2006.01)

(52) U.S. Cl.
CPC ............. *E01H 5/098* (2013.01); *E01H 5/061* (2013.01); *E01H 5/092* (2013.01); *E02F 3/3604* (2013.01)

(58) Field of Classification Search
CPC ...... E02F 3/3672; E02F 3/3668; E02F 3/3604; E01H 5/098; E01H 5/061; E01H 5/092
See application file for complete search history.

(56) References Cited

U.S. PATENT DOCUMENTS

| 1,504,244 A | 8/1924 | Howell |
| 3,640,005 A | 2/1972 | Chiarolanza et al. |
| (Continued) | | |

FOREIGN PATENT DOCUMENTS

| CN | 2465982 Y | 12/2001 |
| CN | 2563186 Y | 7/2003 |
| (Continued) | | |

OTHER PUBLICATIONS

International Search Report and Written Opinion for Application No. PCT/US2022/080762 dated May 4, 2023 (9 pages).

(Continued)

*Primary Examiner* — Jamie L McGowan
(74) *Attorney, Agent, or Firm* — Michael Best & Friedrich, LLP

(57) ABSTRACT

An implement interlock connection system connects an implement to a utility vehicle. The utility vehicle includes an implement interface having a first slot forming in the implement interface at a first position and a second slot formed in the implement interface at a second position spaced from the first position. The implement includes an implement arm having a securing interface with an implement slot defined therein. The implement interlock connection system includes a first lever pivotably coupled to the implement interface and a second lever pivotably coupled to the first lever. The first lever being configured to selectively engage the first slot and the second lever being configured to selectively engage the second slot. The implement is secured to the implement interface of the utility vehicle when the (Continued)

first lever engages the first slot and the second lever engages the second slot.

6 Claims, 23 Drawing Sheets

(56) References Cited

U.S. PATENT DOCUMENTS

| | | | |
|---|---|---|---|
| 3,793,752 A | 2/1974 | Snyder | |
| 3,951,383 A | 4/1976 | Tenney, Jr. | |
| 3,984,016 A | 10/1976 | Kuhn | |
| 3,987,562 A * | 10/1976 | Deen | E01H 5/06 |
| | | | 172/275 |
| 4,085,856 A | 4/1978 | Westendorf | |
| 4,119,225 A | 10/1978 | Macht et al. | |
| 4,342,163 A | 8/1982 | Hoekstra | |
| 4,436,477 A | 3/1984 | Lenertz et al. | |
| 4,469,348 A | 9/1984 | Crook | |
| 4,488,850 A | 12/1984 | Wernimont | |
| 4,545,720 A * | 10/1985 | Cochran | E02F 3/3627 |
| | | | 172/275 |
| 4,619,463 A | 10/1986 | Weaver | |
| 4,812,103 A * | 3/1989 | Cochran | E02F 3/3668 |
| | | | 414/723 |
| 5,004,398 A | 4/1991 | Wagner et al. | |
| 5,046,271 A | 9/1991 | Daniels | |
| 5,078,569 A | 1/1992 | Cook | |
| 5,098,252 A | 3/1992 | Sheesley et al. | |
| 5,562,397 A * | 10/1996 | Albright | E02F 3/3672 |
| | | | 37/468 |
| 5,685,689 A | 11/1997 | Schneider et al. | |
| 5,836,734 A * | 11/1998 | Doering | E02F 3/3672 |
| | | | 414/722 |
| 5,938,399 A | 8/1999 | Knutson | |
| 6,044,579 A | 4/2000 | Hadler et al. | |
| 6,125,619 A | 10/2000 | Wolff | |
| 6,336,281 B2 | 1/2002 | Fulton, III | |
| 6,390,765 B1 | 5/2002 | Dick | |
| 6,397,967 B1 | 6/2002 | McIlwraith | |
| 6,619,906 B2 | 9/2003 | Dick | |
| 6,729,830 B2 | 5/2004 | Wagner et al. | |
| 6,851,916 B2 | 2/2005 | Schmidt | |
| 6,939,099 B1 * | 9/2005 | Stokkeland | E02F 3/3668 |
| | | | 37/468 |
| 7,073,972 B1 | 7/2006 | Schumacher | |
| 7,329,082 B2 | 2/2008 | Warren | |
| 7,455,494 B2 | 11/2008 | Krieger | |
| 7,478,490 B2 * | 1/2009 | Segerljung | E02F 3/3663 |
| | | | 37/468 |
| 7,507,064 B2 | 3/2009 | Shibuya | |
| 7,513,732 B1 * | 4/2009 | Callens | E02F 3/3627 |
| | | | 37/468 |
| 7,524,158 B2 | 4/2009 | Eckstein et al. | |
| 7,648,326 B2 | 1/2010 | Santele et al. | |
| 7,797,859 B2 | 9/2010 | LeBlond et al. | |
| 7,877,834 B2 | 2/2011 | Kallman et al. | |
| 8,444,367 B2 | 5/2013 | Lougheed | |
| 8,979,468 B2 * | 3/2015 | Oyama | E02F 3/3663 |
| | | | 414/723 |
| 9,303,377 B2 | 4/2016 | May et al. | |
| 9,624,641 B2 | 4/2017 | Martin et al. | |
| 9,809,945 B1 | 11/2017 | Middleton | |
| 9,869,067 B2 | 1/2018 | Barker et al. | |
| 10,480,140 B2 | 11/2019 | Vigneault | |
| 10,865,534 B2 | 12/2020 | Martin et al. | |
| 2003/0005605 A1 | 1/2003 | Kaczmarski et al. | |
| 2003/0073400 A1 | 4/2003 | Dahl et al. | |
| 2005/0102778 A1 | 5/2005 | Gregerson | |
| 2006/0210384 A1 * | 9/2006 | Warren | E02F 3/3659 |
| | | | 414/723 |
| 2007/0134081 A1 | 6/2007 | Seabolt | |
| 2007/0280810 A1 * | 12/2007 | Lougheed | E02F 3/3672 |
| | | | 414/723 |
| 2016/0138233 A1 | 5/2016 | Barker et al. | |
| 2016/0208455 A1 * | 7/2016 | Martin | E02F 3/364 |

FOREIGN PATENT DOCUMENTS

| | | |
|---|---|---|
| CN | 2570322 Y | 9/2003 |
| CN | 102418325 B | 9/2014 |
| CN | 204456027 U | 7/2015 |
| CN | 108755555 A | 11/2018 |
| JP | 20090035904 A | 9/2010 |
| KR | 20150041491 A | 4/2015 |
| KR | 1843011 B1 | 3/2018 |
| KR | 2061103 B1 | 12/2019 |
| WO | WO97041309 A1 | 11/1997 |
| WO | WO2007137350 A1 | 12/2007 |

OTHER PUBLICATIONS

International Preliminary Report on Patentability for Application No. PCT/US2022/080762 dated Jun. 12, 2024 (17 pages).
Messick's, "Kubota BX80 Series From Quick Hitch," <https://www.messicks.com/blog/kubota-bx80-series-front-quick-hitch> web page visited Oct. 21, 2021 (3 pages).
Scholten's Equipment, "Kubota RTV-X1100C with K Connect Sweeper and Snowblower," <https://www.youtube.com/watch?v=btD5taYfmqs> YouTube publication date: Jan. 12, 2019 (3 pages).

* cited by examiner

IMPLEMENT FOR SKID STEER VEHICLE

CROSS-REFERENCE TO RELATED APPLICATIONS

This application is claims priority to Canadian Application No. 3,141,241 filed Dec. 4, 2021, which claims priority to U.S. Provisional Patent Application No. 63/285,877 filed on Dec. 3, 2021, the entire contents of all of which are incorporated herein by reference.

BACKGROUND

The present invention relates to an implement for a stand on utility vehicle, such as a snow removal vehicle.

SUMMARY

In one aspect, the invention provides an implement interlock connection system for connecting an implement to a utility vehicle, the utility vehicle including an implement interface having a first slot forming in the implement interface at a first position and a second slot formed in the implement interface at a second position spaced from the first position, and the implement including an implement arm having a securing interface with an implement slot defined therein, the implement interlock connection system comprising: a first lever pivotably coupled to the implement interface, the first lever being configured to selectively engage the first slot; and a second lever pivotably coupled to the first lever, the second lever being configured to selectively engage the second slot; wherein the implement is secured to the implement interface of the utility vehicle when the first lever engages the first slot and the second lever engages the second slot.

In some aspects, the first slot is configured to overlap and align with the implement slot so the first lever extends through the first slot and the implement slot. In some aspects, a biasing member is positioned between the first and second levers which biases the second lever into engagement with the second slot. In some aspects, the first position that the first slot is formed is in a bottom surface of the implement interface, and the second position that the second slot is formed is in a vertical structure of the implement interface. In some aspects, the second lever engages the second slot to prohibit movement of the first lever. In some aspects, the second lever is configured to pivot with the first lever when the second lever is disengaged from the second slot. In some aspects, the first lever includes a first protrusion rotatably received in the first slot, and the second lever includes a second protrusion rotatably received in the second slot.

In another aspect, the invention provides an implement for a utility vehicle, the implement comprising: an implement frame; an implement work member coupled to the implement frame, the implement work member configured to engage the ground surface to perform a working operation related to snow removal; a pair of ground engaging elements configured to guide the implement relative to a ground surface; a prop coupled to a side of the implement frame and configured to rotate relative to the implement frame between a stowed position and a storage position; wherein the prop is configured to bear a substantial portion of the weight of the implement in the storage position, and the implement work member is configured to partially bear the weight of the implement when the prop is in the stowed position.

In some aspects, the prop includes a first end coupled to the implement frame and a second end opposite the first end. In some aspects, the prop is pivotable about the first end. In some aspects, the second end is configured to engage the ground surface to move the implement work member away from the ground surface when the prop is in the storage position. In some aspects, the first end includes a connection member that is selectively received within the implement frame, and the connection member includes a plurality of apertures that align with apertures formed in the implement frame to receive a pin that secures the prop in the stowed position or the storage position. In some aspects, the pair of ground engaging elements are wheels. In some aspects, the implement work member is a powered brush. In some aspects, the powered brush includes a plurality of bristles, wherein the prop inhibits deformation of the plurality of bristles when the prop is in the storage position.

In another aspect, the invention provides an implement support assembly for interconnecting an implement to a utility vehicle to permit movement of the implement relative to the utility vehicle, the implement support assembly including an implement interface that engages a securing interface of the implement, the implement support assembly comprising: an interface support frame pivotably coupled to a vehicle frame, the interface support frame including an interface support arm and a float feature; and a hydraulic cylinder coupled to the vehicle frame and configured to move the interface support frame relative to the vehicle frame, the float feature being positioned between the interface and the hydraulic cylinder, wherein the float feature is configured to permit the implement to move independently from the hydraulic cylinder in response to ground undulations.

In some aspects, the hydraulic cylinder is configured to extend and retract to adjust a position of the interface support frame and the implement. In some aspects, the float feature includes a link having a first end coupled to the support arm, a second end coupled to the hydraulic cylinder, and a protrusion positioned between the first and second ends, wherein the support arm includes an interface slot, and wherein the protrusion is slidably received within the interface slot to provide lost motion between the link and the support arm. In some aspects, the interface slot is open ended and faces away from the implement. In some aspects, the lost motion is over an arclength described by the protrusion when pivoting from one end of the interface slot to an opposite end. In some aspects, the arclength is in a range from 0.5 to 3 inches.

Other aspects of the invention will become apparent by consideration of the detailed description and accompanying drawings.

DETAILED DESCRIPTION

Figure 1:
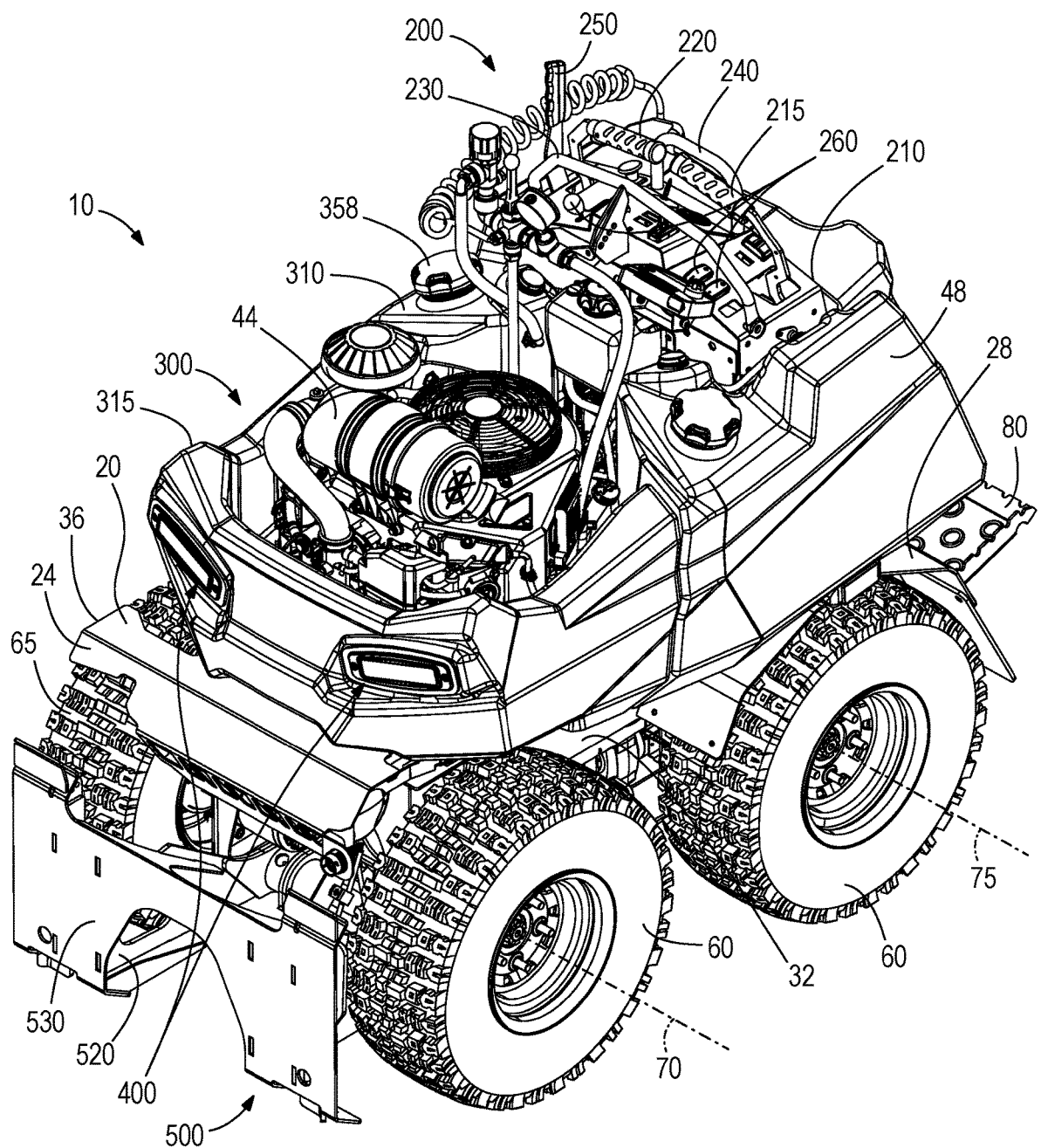
FIG. 1 is a front perspective view of a stand-on snow removal vehicle according to the present invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

FIGS. 1-6 illustrate an exemplary embodiment of a snow removal vehicle 10 according to the present invention. In the illustrated embodiment, the snow removal vehicle is in the form of a stand-on snow removal vehicle 10 having an implement 510 (FIG. 6) coupled to the vehicle 10.

Although the present invention is described with respect to the illustrated snow removal vehicle, it will be understood that the invention is applicable to other indoor and outdoor power equipment units and more broadly to utility machines that can be used indoors or outdoors to perform work. As such, aspects of the invention which are described as being part of the "vehicle" will be understood to be applicable to utility machines generally and the term "machine" can be substituted to for "vehicle". Spatial terminology (e.g., "front," "rear," "left," "right," "forward," "back," "up," "down," and similar terms) will be used from the perspective of an operator during ordinary, intended operation of the utility machine. The term "side" is used to denote left, right, front and rear of a component, unless otherwise specified, as distinguished from the top and bottom of the component.

Generally speaking, utility machines of the type covered by the present invention include an implement, which encompasses any implement on such utility machine that performs work other than moving the utility machine (e.g., driving rotation of wheels or track drives). In the embodiment illustrated in FIG. 6, the implement 510 comprises a snow plow coupled to and positioned forward of the vehicle 10. In other embodiments, the implement comprises a drop spreader for ice melting particulate (e.g., salt or other snow melting crystals). In some embodiments, the drop spreader may be coupled to and positioned rearward of the vehicle. It should also be appreciated that the utility vehicle 10 may include more than one implement (e.g., both the snow plow and the drop spreader). In the embodiment of FIGS. 7, 8, and 18-23, the implement comprises a snow blower. In the embodiment of FIGS. 24-29, the implement comprises a rotating brush. In other embodiments, the implement comprises leaf blowers, snow blowers, power brush implements, trimmers, tillers, multi-attachment vehicles, floor polishers, vacuum cleaners, wet vacs, concrete trowels, or any other indoor or outdoor work unit suitable for a given application. In other embodiments, the implement comprises combinations of the exemplary implements illustrated in the drawings or mentioned above.

The vehicle 10 includes a frame 20, a skid steer drive assembly 40 (FIG. 4), ground engaging elements 60, 65, an operator platform 80 coupled to the frame 20, an operator interface 200 positioned proximate the operator platform 80, a brine assembly 300 coupled to the frame 20, a light assembly 400 supported relative to the frame 20, and an implement support assembly 500 coupled to the frame 20 and configured to selectively receive the implement 510 (FIG. 6) in front of the frame 20. The frame 20 includes a front end 24 (FIG. 1), a rear end 28 (FIG. 2) opposite the front end, a first or left side 32 (FIG. 1) extending between the front and rear ends, and a second or right side 36 (FIG. 5) extending between the front and rear portions 24, 28.

Figure 3:
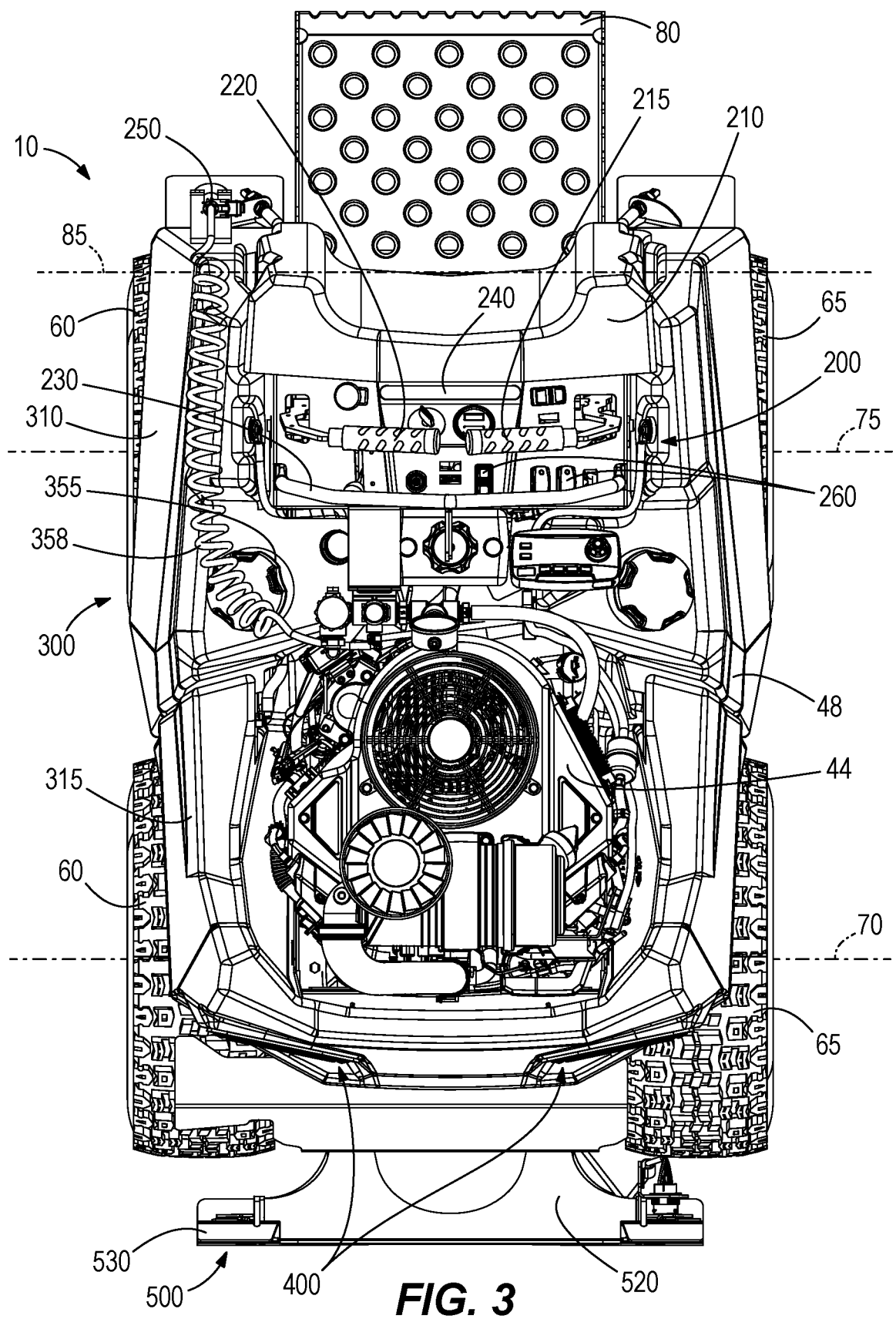
FIG. 3 is top view of the stand-on snow removal vehicle of FIG. 1.
Figure 4:
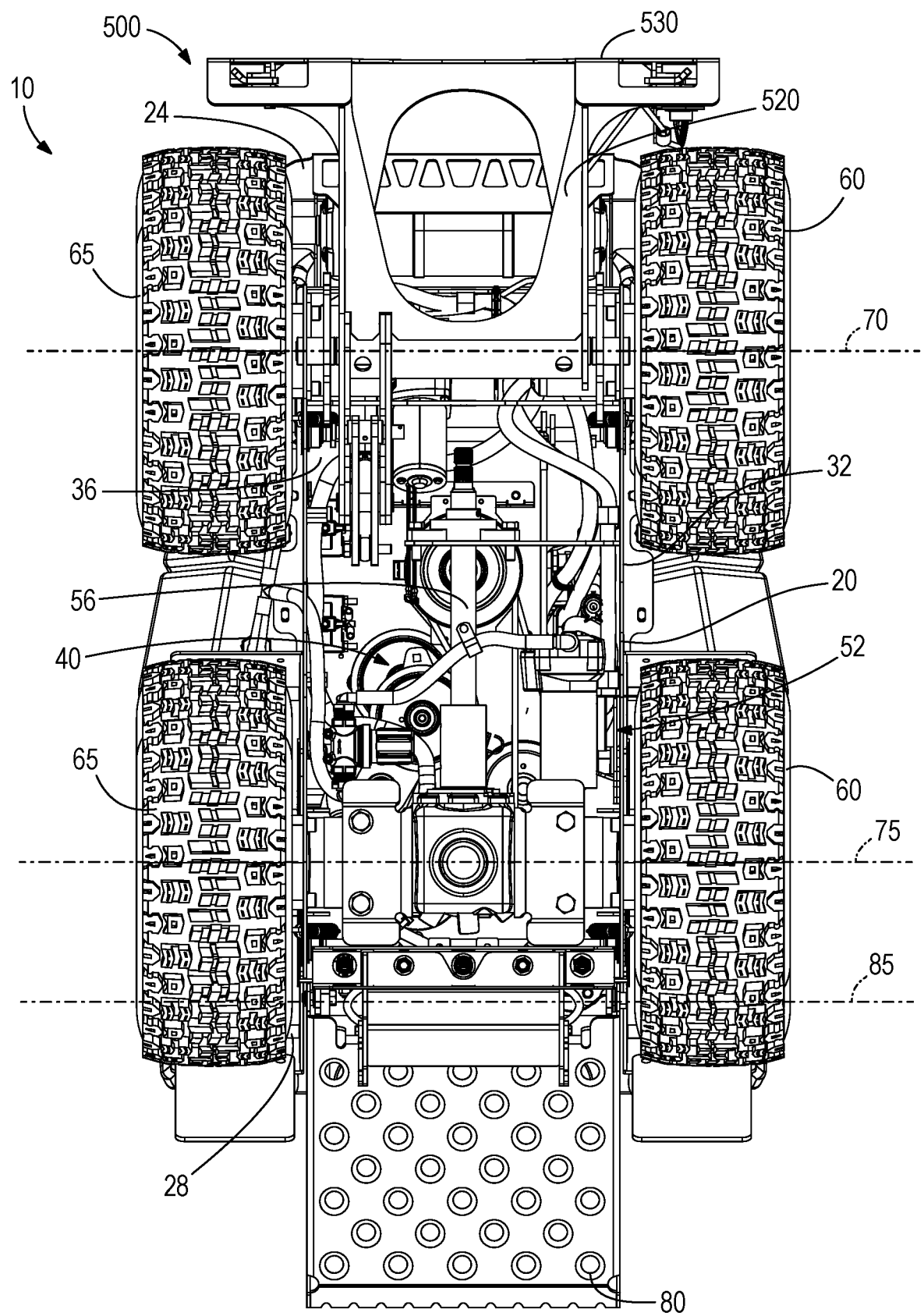
FIG. 4 is a bottom view of the stand-on snow removal vehicle of FIG. 1.

With reference to FIGS. 3 and 4, the skid steer drive assembly 40 (FIG. 4) includes an internal combustion engine 44 (FIG. 3) mounted to the frame 20, a fuel tank 48 (FIG. 3) coupled to the frame 20 to provide fuel to the engine 44, and a hydraulic system 52 (FIG. 4) operably coupled to the ground engaging elements 60, 65. As shown in FIGS. 1 and 3, the internal combustion engine 44 is mounted to a top portion of the frame 20 (e.g., above a front drive axis 70 and a rear drive axis 75 of the ground engaging elements 60, 65). The brine assembly 300 and the fuel tank 48 extend around the front, right side, left side, and a portion of the rear of the engine 44 such that all sides of the engine 44 are substantially enclosed by the brine assembly 300 and fuel tank 48, while the top of the engine 44 is exposed.

As shown in FIG. 4, the internal combustion engine 44 (FIG. 3) drives the hydraulic system 52 to rotate the ground engaging elements 60, 65 and also drives a rotating output shaft or power takeoff shaft (PTO) 56 that may be coupled to an implement (e.g., such as a snow blower, brushroll, etc.) to drive a work implement member. In some embodiments, the vehicle may include a single reservoir coupled to a two-stage hydraulic pump (e.g., having a single input and two outputs). The hydraulic pump may drive the ground engaging elements 60, 65. In other embodiments, the vehicle 10 may include separate hydraulic pumps and reservoirs to respectively drive the ground engaging elements 60. The hydraulic system 52 also applies the torque to respective left and right ground engaging elements 60, 65 in response to an input from the operator interface 200. In the illustrated embodiment, the ground engaging elements 60, 65 include a pair of left drive wheels 60 (front and rear) and a pair of right drive wheels 65 (front and rear). The left drive wheels 60 are hydraulically coupled and the right drive wheels 65 are hydraulically coupled. "Hydraulically coupled" means that the pairs of wheels 60, 65 are simultaneously and synchronously driven by the hydraulic system 52 and neither of the pair can be driven independently of the other. The drive wheels 60, 65 support the mower frame 20 and rotate under the influence of the skid steer drive assembly 40 to move the vehicle 10 across the ground surface.

In other embodiments of the invention, the internal combustion engine 44 is replaced with an electric motor or any other suitable prime mover (e.g., a hybrid gas/electric motor, a fuel cell, or any other suitable device operating on a suitable fuel). If a prime mover capable of modulating speed is employed (e.g., an electric motor), the hydraulic system (hydraulic pump and hydraulic motor) can be dispensed with and the primary mover can provide power directly to the differential. In other embodiments the drive wheels 60, 65 could be replaced with track drives or any other suitable tractive elements. Left and right drive shafts of the front wheels are coaxial about the front drive axis 70 and the left and right drive shafts of the rear wheels are coaxial about the rear drive axis 75. The front and rear drive axes 70, 75 can collectively be referred to as the drive shafts of the vehicle 10.

Figure 2:
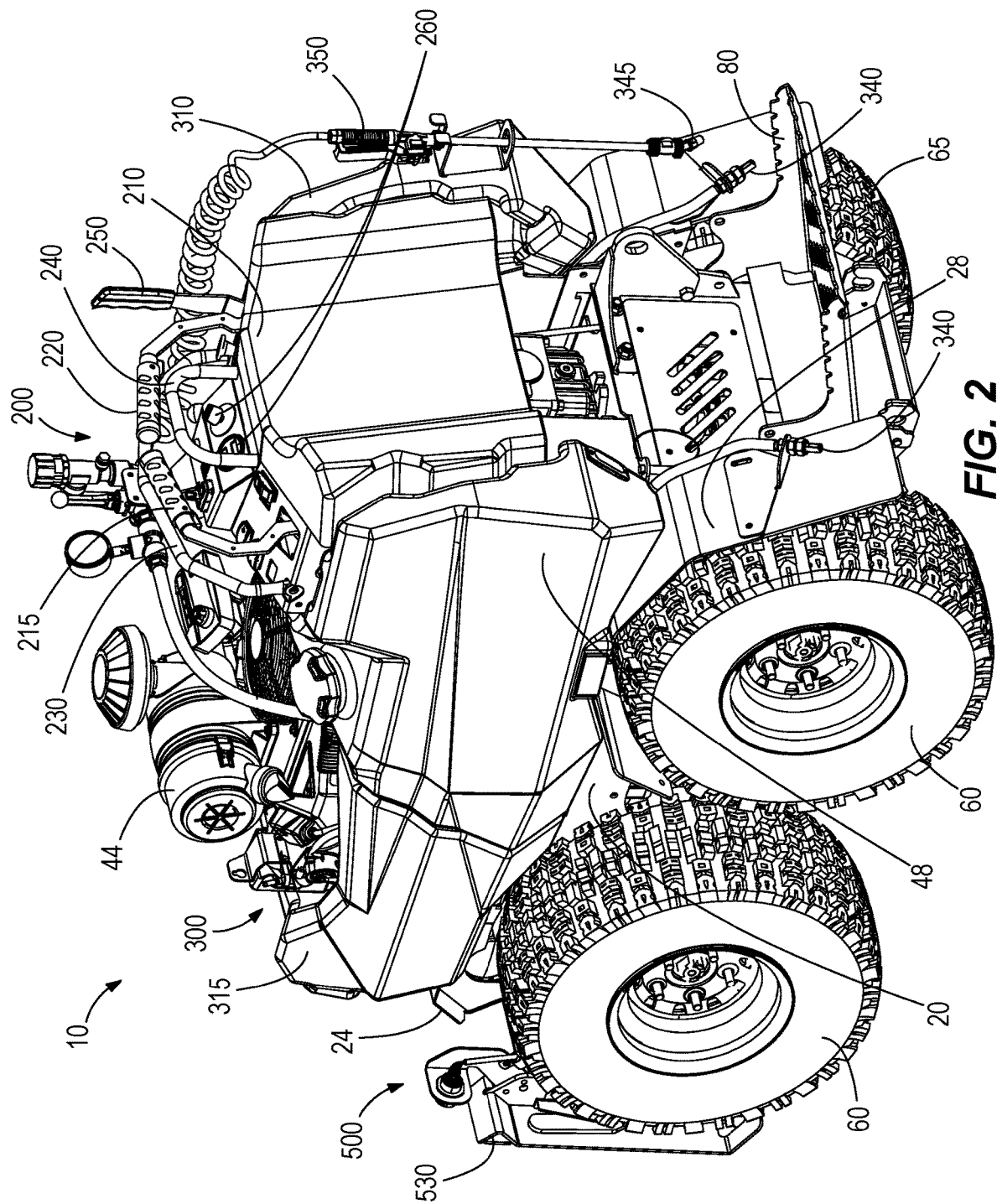
FIG. 2 is a rear perspective view of the stand-on snow removal vehicle of FIG. 1.

With reference to FIGS. 2 and 4, the operator platform 80 is pivotably coupled to the frame 20 and positioned rearward of the frame 20. The operator platform 80 is configured to support an operator in a standing position and provide access to the operator interface 200, which is positioned in front of the operator platform 80. In other words, at least a portion of the operator platform 80 is positioned rearward of the operator interface 200 and a rearward-most ground engaging element 60, 65 (e.g., the rear wheels). The operator platform 80 is pivotally mounted to the frame 20 about an axis 85 (FIG. 4) that is rearward of the rear drive axes 75 and the platform 80 is entirely rearward of the rear drive axes 75. In some embodiments, a suspension system or vibration dampening mechanism may be positioned between the frame 20 and the operator platform 80.

The operator interface 200 is positioned on top of a vertical structure or control tower 210 and are accessible by the operator standing on the platform 80. The operator interface 200 comprises a plurality of handles, levers, switches, or the like and are configured to control operation of one or more components (e.g., drive assembly, implement support assembly, implement, etc.). In the illustrated embodiment, the operator interface 200 include a pair of control levers 215, 220, a first or front speed limiter 230 and a second or rear speed limiter 240, which respectively restrict forward and rearward movement of the control levers 215, 220. In the illustrated embodiment, the first speed limiter 230 is pivotably coupled on top of the control tower 210, which allows the operator to adjust the forward range of the control levers 215, 220 and therefore the speed of the vehicle 10. The operator interface 200 also includes a parking brake 250 to selectively restrict movement of the vehicle 10 and one or more a hand controls 260. The hand controls 260 may include multiple functions that can be manipulated by the operator's hands. Some examples of hand controls 260 include: an implement control for transmitting power from the engine 44 to adjust the position of the implement support assembly, a brine control to dispense brine from the brine assembly 300, a light switch, an engine throttle, an engine choke, an engine kill switch, and a hydraulic motor or pump control for controlling the speed and direction of operation of the drive wheels 60, 65. In other constructions, the hand controls 260 may include additional controls to operate other implements coupled to vehicle 10.

Figure 5:
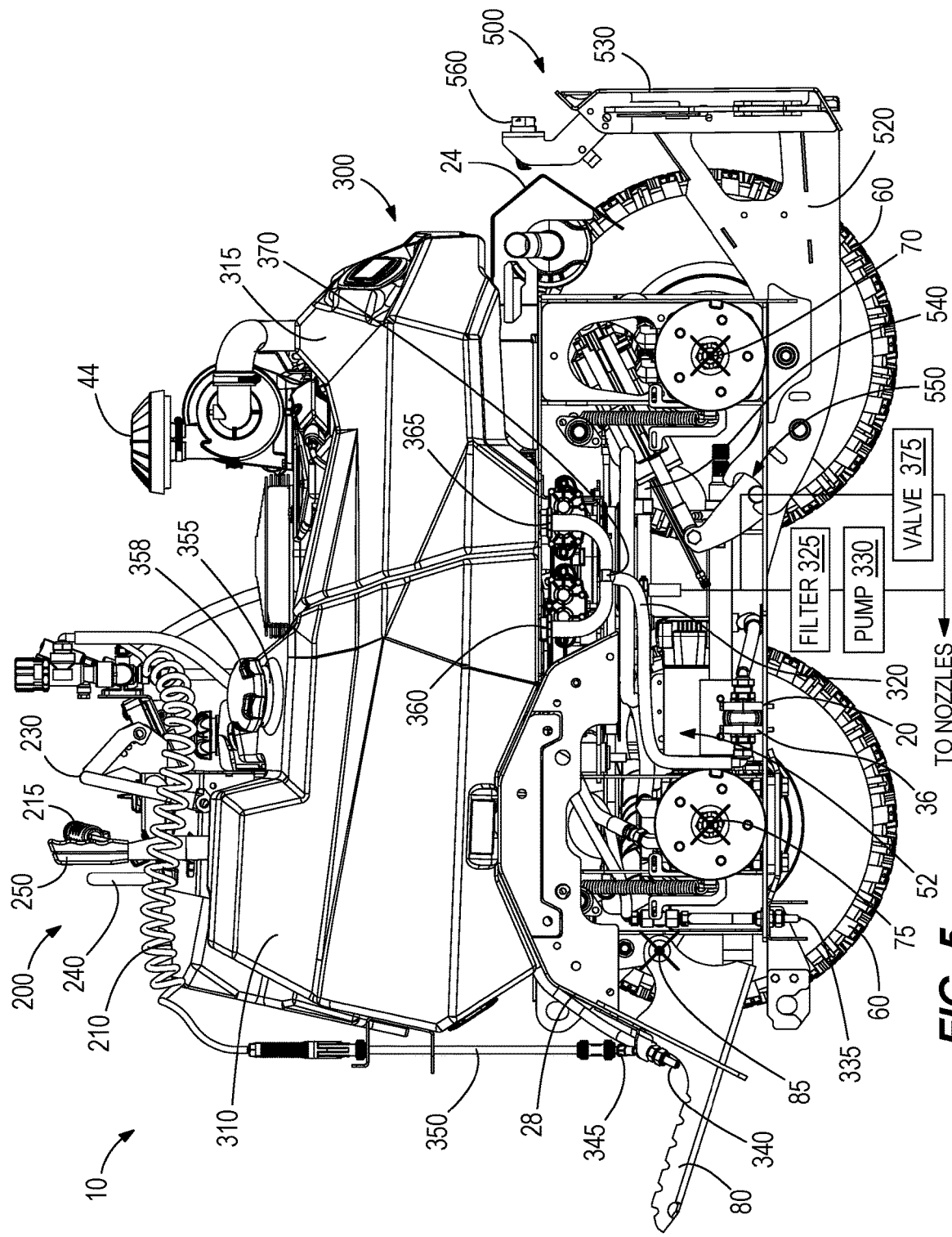
FIG. 5 is a side view of the stand-on snow removal vehicle of FIG. 1 with a portion of the vehicle removed to illustrate an implement support assembly.

As shown in FIGS. 3-5, the brine assembly 300 is coupled to the frame 20 forward at least a portion of the operator platform 80. In the illustrated embodiment, the brine assembly 300 includes a first fluid or brine tank 310, a second fluid or brine tank 315 that is in fluid communication with first brine tank 310, an outlet hose 320 in fluid communication with both the first and second brine tanks 310, 315, a filter 325 (schematically illustrated in FIG. 5) coupled to the outlet hose 320 downstream the brine tanks 310, 315, a pump 330 (schematically illustrated in FIG. 5) coupled to the outlet hose 320 downstream the filter 325, and a one or more of nozzles 335, 340, 345 coupled to the outlet hose 320 downstream the pump 330. In other embodiments, the brine assembly 300 may include a single brine tank. The pump 330 draws the fluid from the brine tanks 310, 315 through the outlet hose 320 to dispense the fluid through the nozzles 335, 340, 345. The nozzles 335, 340, 345 are coupled to the vehicle 10 rearward of the ground engaging elements 60, 65 to disperse the fluid behind the vehicle 10 during operation. Further, the plurality of nozzles 335, 340 are rigidly coupled to the vehicle 10 and the nozzle 345 is coupled to a hand wand 350 that is removably coupled to the vehicle 10. The hand wand 350 is coupled to the vehicle 10 proximate the operator platform 80 so the operator can selectively dispense brine to a desired area surrounding the vehicle 10.

The first brine tank 310 includes an inlet 355 having a cap 358 removably coupled thereto. The inlet 355 is configured to receive a fluid (e.g., brine). Each of the first and second brine tanks 310, 315 includes an outlet 360, 365 (FIG. 5) with the outlet hose 320 coupled thereto. In the illustrated embodiment, the outlet hose 320 includes a three-way junction 370 positioned between the outlets 360, 365 of the brine tanks 310, 315 and the filter 325, which allows fluid to move between the first and second brine tanks 310, 315 and through the filter 325 to the pump 330. In some embodiments, a valve 375 (schematically illustrated) may be positioned between the brine tanks 310, 315 and the filter 325. The valve 375 allows the operator to prevent fluid flow from the brine tanks 310, 315 so the operator can replace the filter 325 without emptying the brine tanks 310, 315. In some embodiments, a second valve may be positioned between the pump 330 and the nozzles 335, 340, 345 to prevent the backflow of fluid through the outlet hose 320 during replacement of the filter 325.

Figure 6:
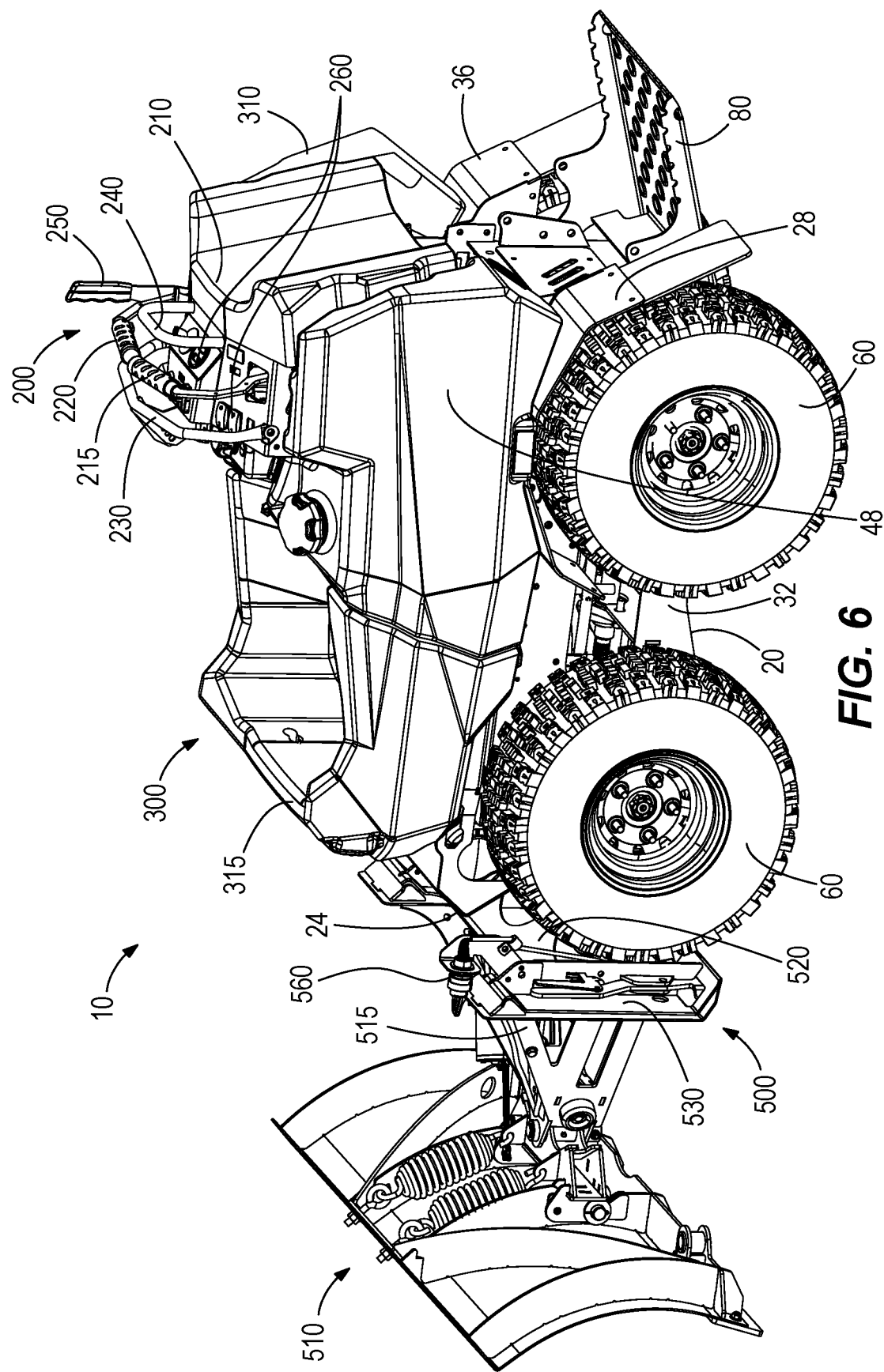
FIG. 6 is a rear perspective view of the stand-on snow removal vehicle of FIG. 1 having an implement coupled to the implement support assembly and supported in front of the vehicle.
Figure 7:
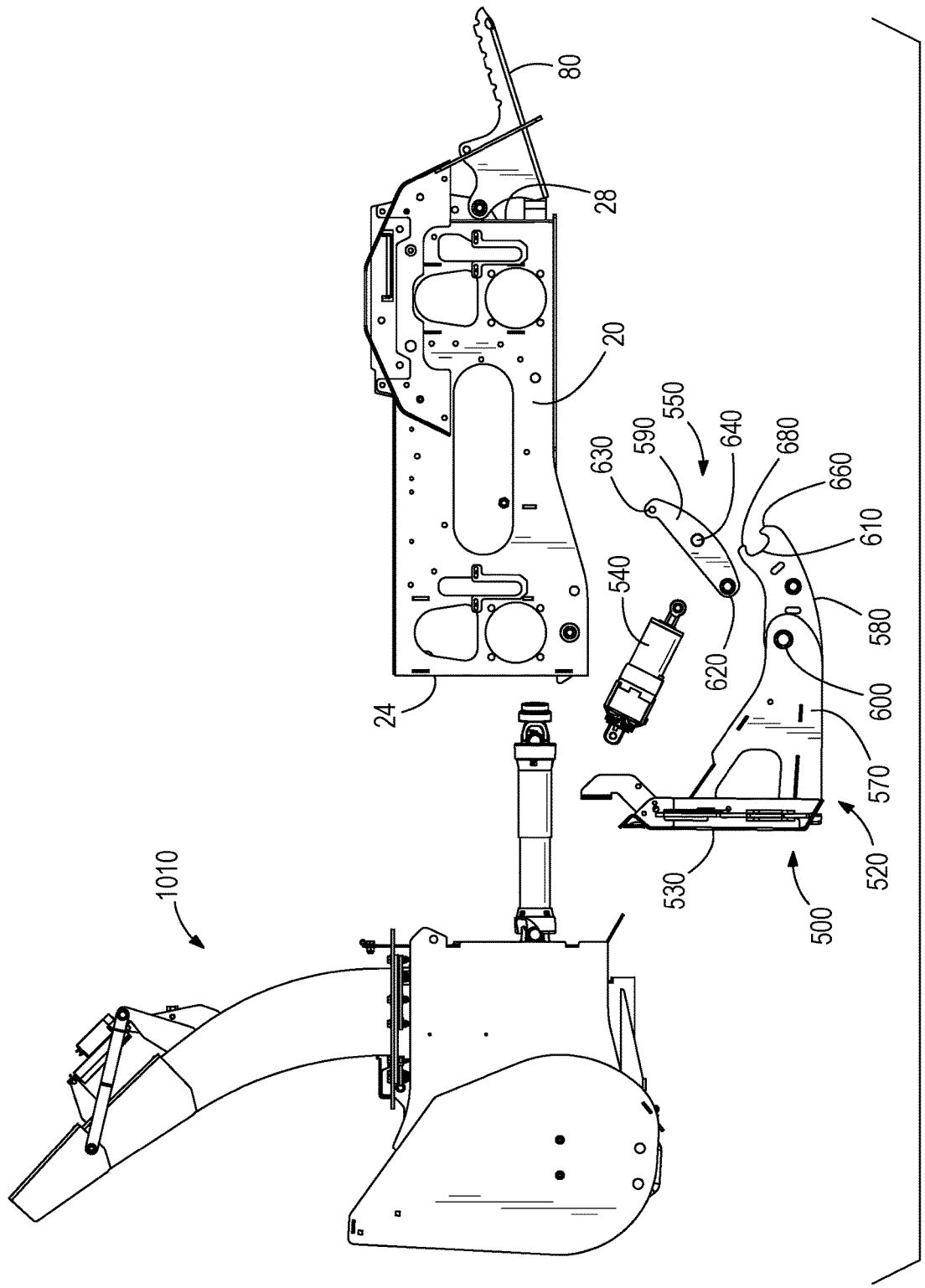
FIG. 7 is a side exploded view of the implement support assembly of FIG. 5.

As shown in FIGS. 5 and 6, the implement support assembly 500 is pivotably coupled to the front end 24 of the frame 20. The implement support assembly 500 is configured to removably receive the implement 510 (FIG. 6) such as a snowplow having an implement arm 515. The implement support assembly 500 includes an interface support frame 520 pivotably coupled to the vehicle frame 20, an implement interface 530 coupled to the interface support frame 520 and configured to receive the implement arm 515 of the implement 510 (FIG. 6), and a hydraulic cylinder 540 (FIG. 5) having a first end coupled to the vehicle frame 20 and a second end coupled to the interface support frame 520 through a float feature 550. The hydraulic cylinder 540 is configured to adjust the position (e.g. vertical or pitch position) of the interface support frame 520 and the implement 510 in response to an input from the operator interface 200. In the illustrated embodiment, the hydraulic cylinder 540 is an electric over hydraulic actuator. The implement support assembly 500 further includes an electrical connector 560 supported relative to the interface support frame 520. The electrical connector 560 may be coupled to the implement 510 to drive a working member of the implement. In some embodiments, the implement (e.g., such as a plow) may include a secondary hydraulic cylinder coupled to the electrical connector 560, which allows the operator to adjust a yaw position of the implement 510 (e.g., using the operator interface 200). In other embodiments, the implement (e.g., such as a snow blower, brushroll, etc.) may include an output or work shaft that is coupled to the PTO shaft 56 to drive a working member (e.g., snow blower, brush roll, etc.) of the implement, which allows the operator to selectively activate the working member of the implement to perform a function.

As shown in FIGS. 5 and 7-8C, the interface support frame 520 includes an interface support arm 570 and the float feature 550, which couples the interface support arm 570 to the vehicle frame 20 through a connection with the hydraulic cylinder 540. In the illustrated embodiment, an implement 1010 (i.e., a snow blower) is coupled to the implement interface 530. The implement 1010 is described in more detail below and it should be appreciated that any of the implements described herein may be coupled to the interface support frame 520. The interface support arm 570 extends rearwards from the implement interface 530 towards the hydraulic cylinder 540. In the illustrated embodiment, the interface support arm 570 includes a Y-bracket having a first end connected to a rear portion of the implement interface 530 (e.g., at branches of the Y-bracket) and a second end (e.g., a base) opposite the first end.

The float feature 550 includes a first link 580 coupled to the interface support arm 570 and a second link 590 having a first end coupled to the first link 580 and a second end coupled to the hydraulic cylinder 540. In the illustrated embodiment, the first link 580 and the support arm 570 are formed as a single weldment. Therefore, it should be appreciated that the first link 580 may be referred to as part of the interface support arm 570. In other embodiments, the first link 580 may be pivotably coupled to the second link 590 such that limited pivotable movement between the first and second links 580, 590 is allowed (e.g., approximately 5 degrees of relative movement). As described in more detail below, the float feature 550 permits the implement 1010 to move independently from the hydraulic cylinder 540 in response to ground undulations. In the illustrated embodiment, a first end of the first link 580 and the support arm 570 are pivotably coupled to the vehicle frame 20 via a first connection pin 600. A second end of the first link 580 is opposite the first end and defines an interface slot 610. The interface slot 610 is open ended and faces away from the first connection pin 600 and thus faces away from the implement 1010. The second link 590 includes a first end pivotably coupled to the second end of the interface support arm 570 via a second connection pin 620 and a second end pivotably coupled to the hydraulic cylinder 540 via a third connection pin 630.

The second link 590 of the float feature 550 further includes a protrusion 640 that is slidably received in the interface slot 610. In other embodiments the protrusion 640 may be a pin, or the like. The protrusion 640 is positioned between the first and second ends (e.g., in the middle) of the second link 590.

Figure 8A:
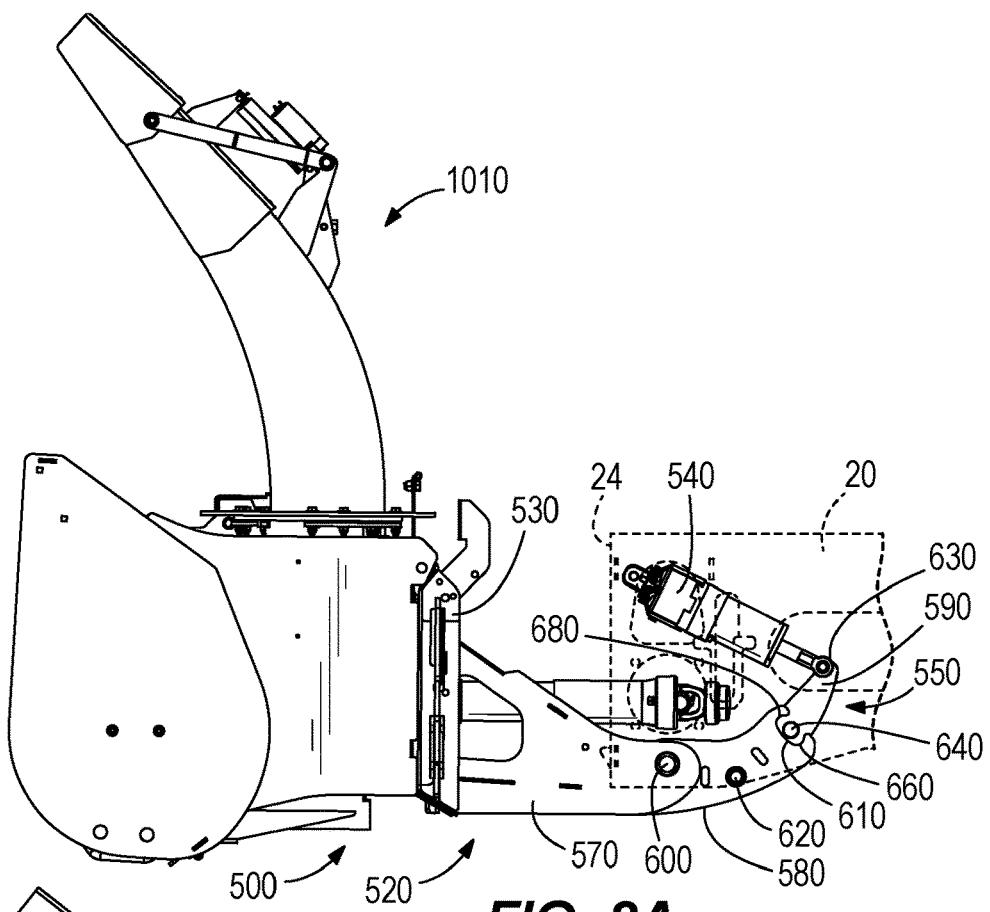
FIG. 8A is a side view of the implement support assembly of FIG. 5 coupled with an implement, illustrating the implement in a first position.
Figure 8B:
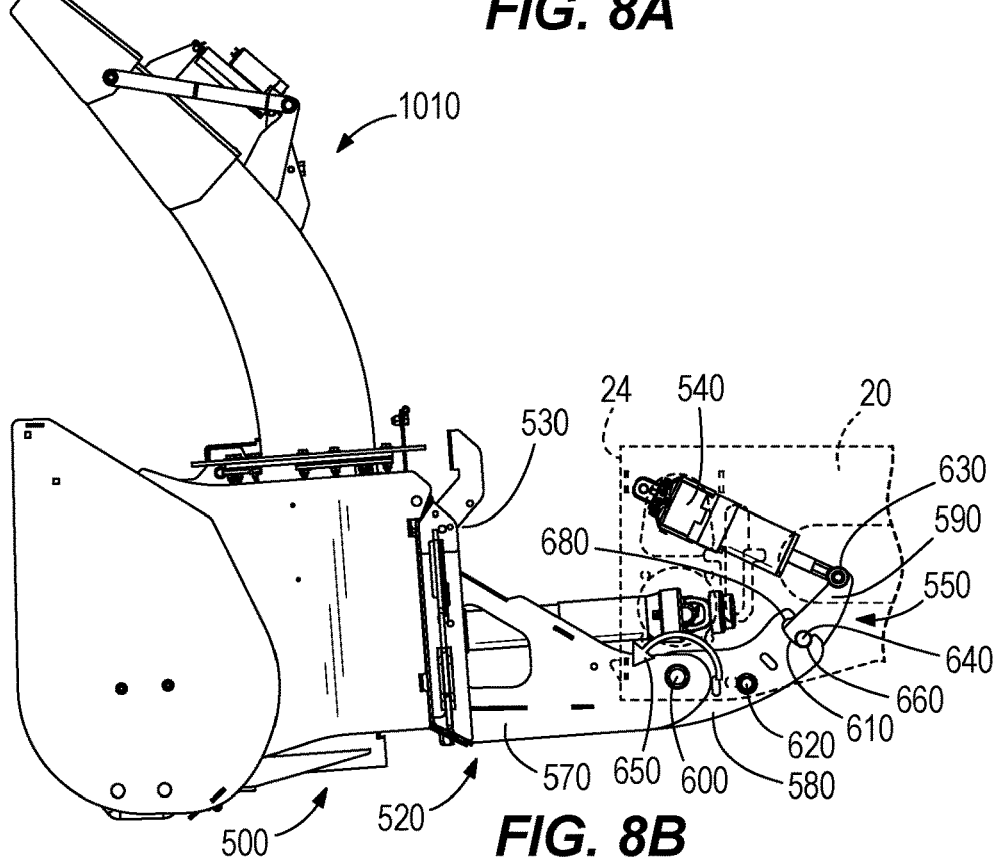
FIG. 8B is a side view of the implement support assembly of FIG. 5 coupled with an implement, illustrating the implement in a second position.
Figure 8C:
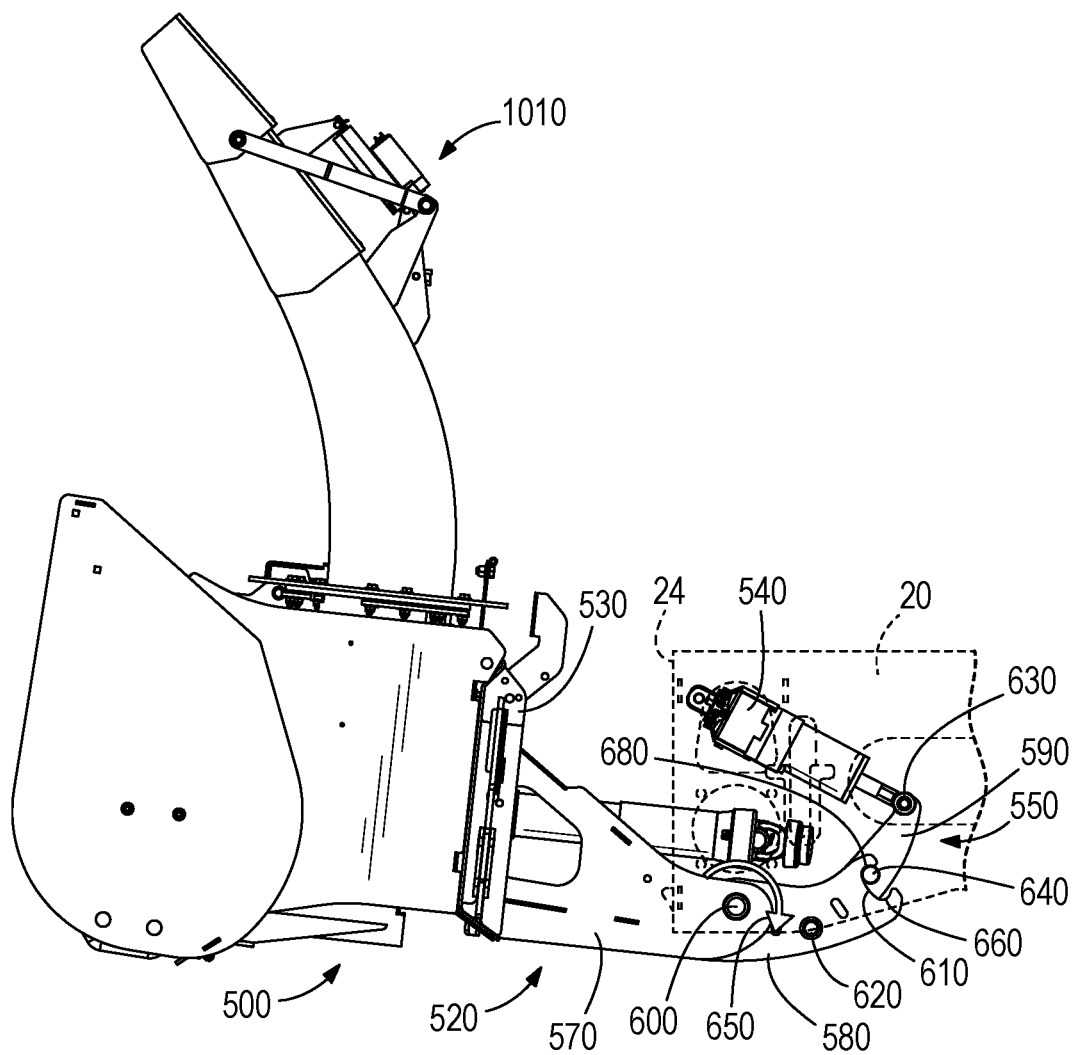
FIG. 8C is a side view of the implement support assembly of FIG. 5 coupled with an implement, illustrating the implement in a third position.

The hydraulic cylinder 540 is coupled to the second end of the second link (FIGS. 8A-8C). More specifically, the hydraulic cylinder 540 is configured to extend and retract to adjust a position (e.g. vertical or pitch position) of the interface support frame 520 and the implement 1010 in response to an input from the operator interface 200. Operation of the hydraulic cylinder 540 pivots the second link 590 with respect to the first link 580 on the second connection pin 620. When second link 590 has pivoted a sufficient amount with respect to the first link 580, the protrusion 640 on the second link 590 engages an end of the interface slot 610 such that any further pivoting of the second link 590 in the same direction is transferred to the first link 580 (i.e., the first and second links 580, 590 are coupled for pivoting together). With the first and second links 580, 590 coupled for pivoting together, the hydraulic cylinder 540 can apply a pivoting (i.e., tilt) force to the implement 1010 to raise or lower it.

With reference to FIGS. 8A-8C, extension and retraction of the hydraulic cylinder 540 pivots the second link 590 with respect to the first link 580. As the second link 590 pivots with respect to the first link 580, the protrusion 640 moves within the interface slot 610 until the protrusion 640 engages an end of the interface slot 610. Further pivoting of the second link 590 after the protrusion 640 has engaged an end of the interface slot 610 is transferred to the first link 580 through the protrusion 640, such that the first link 580 pivots with the second link 590. In summary, the interface slot 610 and the protrusion 640 provide lost motion between the first and second links 580, 590 and couple the first and second links 580, 590 for pivoting together after the lost motion reaches its end (i.e., when the protrusion 640 engages an end of the interface slot 610). In the illustrated embodiment, the lost motion is over an arclength of 1.2 inches which is the arclength described by the protrusion 640 when pivoting from one end of the interface slot 610 to the opposite end. In other embodiments, the arclength may be in a range from 0.5 to 3 inches.

The float feature 550 allows the first and second links 580, 590 to move relative to each other without transferring torque between the first and second links 580, 590. In other words, float feature 550 provides lost motion between the first and second links 580, 590. The lost motion permits the implement 510 to float (i.e., ride up and down over the surface under it) relative to the vehicle frame 20 without any force being transmitted back to the hydraulic cylinder 540 and therefore without requiring actuation of the hydraulic cylinder 540 to accommodate the float. In the illustrated embodiment, the lost motion (i.e., the range of motion of the protrusion 640 within the interface slot 610 between the ends of the interface slot 61) is approximately 15 degrees.

In operation, the implement 1010 may be subjected to ground undulations that cause the implement 1010 to move. For example, a bump on the ground in the path of the implement 1010 may cause the implement 1010 to lift up as a result of traveling over the bump. The float feature 550 permits the implement 1010 to move in response to ground undulations without operation of the hydraulic cylinder 540. In other words, the float feature 550 is thus configured to absorb mechanical energy from the ground undulations (e.g., a bump, a divot, or the like) in place of the hydraulic cylinder 540, which reduces the stress on the hydraulic cylinder 540 and allows the implement to follow the ground contour.

For example, FIGS. 8A-8C illustrate the movement of the implement 1010 between three positions. FIG. 8A illustrates the implement 1010 in a first, neutral position (e.g., when the implement 1010 is traversing a flat ground surface. In the first position, the protrusion 640 of the second link 590 is positioned centrally between opposing ends of the interface slot 610. When the implement 1010 traverses across a declined surface (e.g., a back side of a bump, downward ramp, a decline, etc.) the float feature 550 allows the implement 1010 and the interface support arm 570 to move to a second position (FIG. 8B). When the implement 1010 moves towards the second position, the support arm 570 and first link 580 pivot together in the counterclockwise direction 650, which causes the protrusion 640 of the second link 590 to move towards a first end 660 of the interface slot 610 (e.g. the second link pivots in the clockwise direction), which allows the implement 1010 to float downward without actuation of the hydraulic cylinder 540. When the implement 1010 traverses across an inclined surface (e.g., a bump, an upward ramp, etc.) the float feature 550 allows the implement 1010 and the interface support arm 570 to move to a third position (FIG. 8C). When the implement 1010 moves towards the third position, the support arm 570 and first link 580 pivot together in the clockwise direction 670, which causes the protrusion 640 of the second link 590 to move towards a second end 680 of the interface slot 610 (e.g. the second link pivots in the clockwise direction), which allows the implement to float upward without actuation of the hydraulic cylinder 540.

Figure 9:
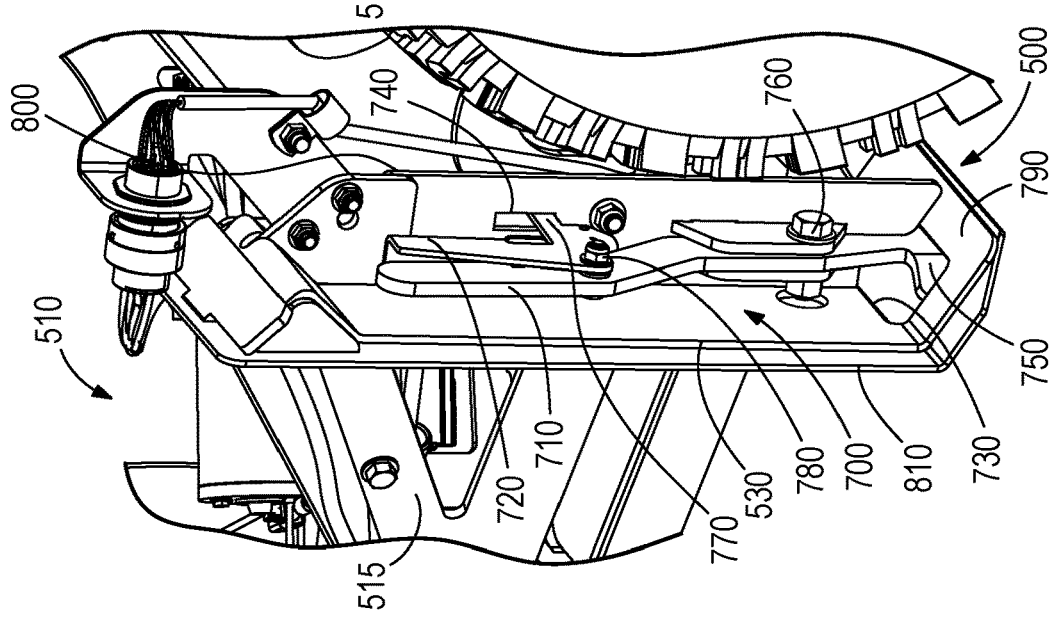
FIG. 9 is an isolated rear perspective view of a portion of the stand-on snow removal vehicle of FIG. 6, illustrating an implement interlock connection system in a first, locked position.

As illustrated in FIGS. 6 and 9-11, the implement interface 530 includes an implement interlock connection system 700 configured to engage the implement 510 to secure the implement 510 to the implement support assembly 500. The implement interlock connection system 700 includes a first lever 710 pivotably coupled to the implement interface 530, a second lever 720 pivotably coupled to the first lever 710, a first slot 730 formed in the implement interface 530 at a first position, and a second slot 740 formed in the implement interface 530 at a second position. The interlock connection system 700 further includes a biasing member (not shown) positioned between the first and second levers 710, 720, which biases the second lever 720 into engagement with the second slot 720 (FIG. 9). While only a left side of the vehicle 10 and the left implement interlock connection system 700 is illustrated and described in detail below, it should be appreciated that the vehicle includes a second or right implement interlock connection system that is identical to the right implement interlock connection system 700. In other words, components of the implement interlock connection system 700 positioned on the left and right sides of the vehicle are identical.

Figure 11:
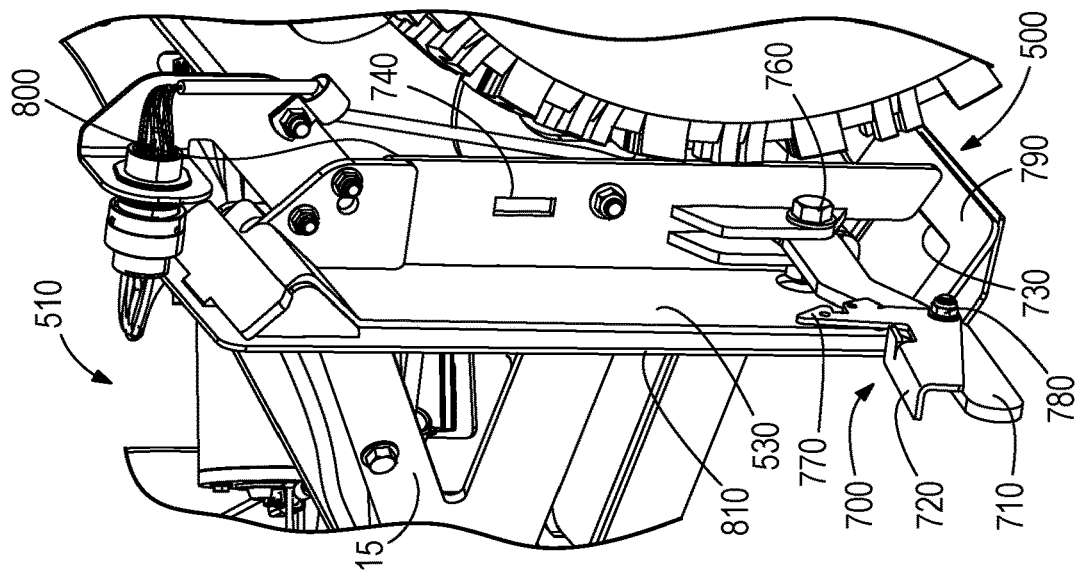
FIG. 11 is another isolated rear perspective view of a portion of the stand-on snow removal vehicle of FIG. 6, illustrating the implement interlock connection system in a third, unlocked position.

The first lever 710 includes a first end defining a lever protrusion 750 that selectively engages the first slot 730 and a second end opposite the first end. The first lever 710 is pivotably coupled to the implement interface 530 at a pivot point 760, which is positioned proximate the lever protrusion 750 of the first lever 710. The second lever 720 includes a first end and a second lever protrusion 770 positioned proximate the first end, which selectively engages the second slot 740. The second lever 720 is pivotably coupled to the first lever 710 at a second pivot point 780. Therefore, the second lever 720 is configured to pivot both independently from or relative to the first lever 710 (FIG. 10) and pivot with the first lever 710 as the implement interlock connection system 700 is moved between a locked position (FIG. 9) and an unlocked position (FIG. 11).

The first slot 730 defines a first engagement portion that is formed in a bottom surface 790 (i.e., the first position) of the implement interface 530. In the illustrated embodiment, the first slot 730 has a generally square shape. In other embodiments, the first slot 730 may have an alternative geometry. The second slot 740 defines a second engagement portion that is formed in a vertical structure 800 of the implement interface 530. In the illustrated embodiment, the second slot 740 has a generally rectangular shape. In other embodiments, the second slot 740 may have an alternative geometry.

Figure 10:
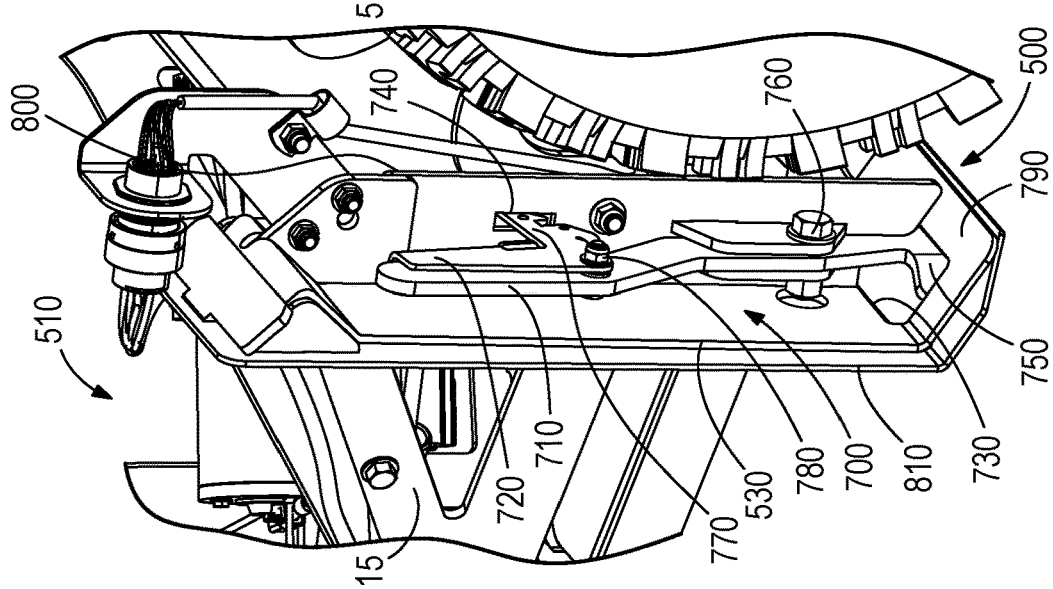
FIG. 10 is another isolated rear perspective view of a portion of the stand-on snow removal vehicle of FIG. 6, illustrating the implement interlock connection system in a second, intermediate position.
Figure 12:
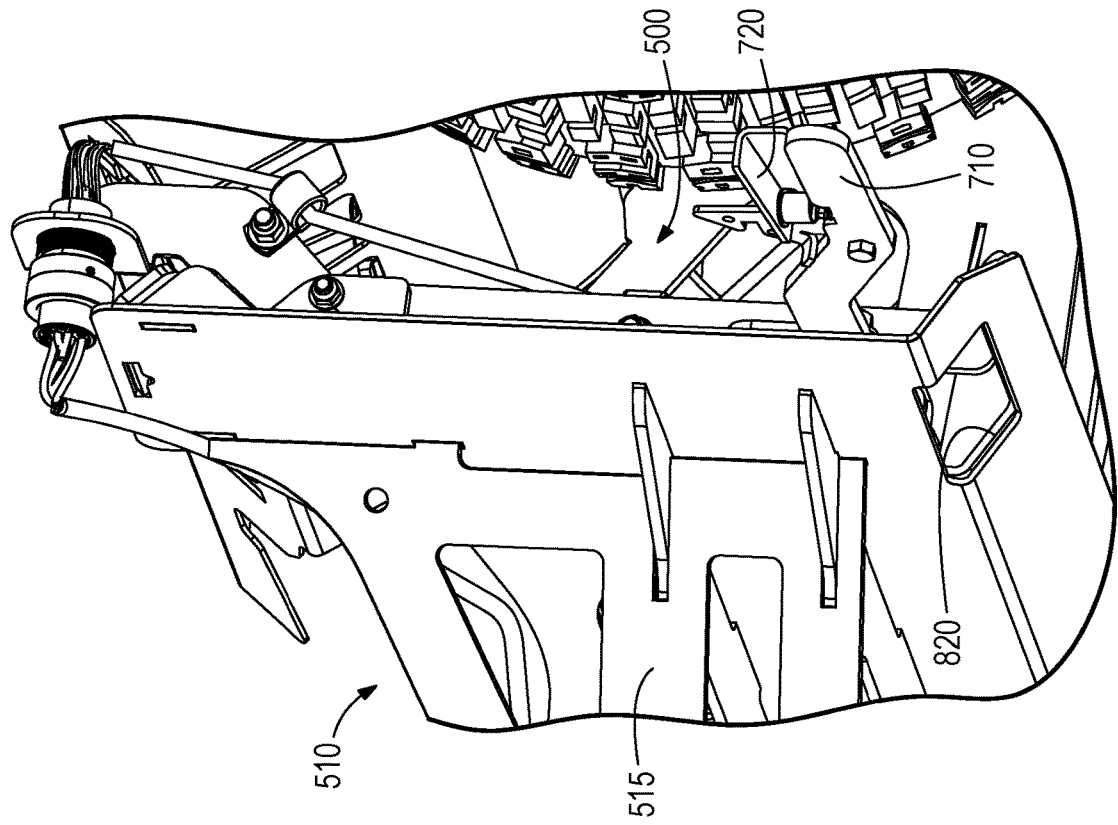
FIG. 12 is an isolated front perspective view of a portion of the stand-on snow removal vehicle of FIG. 6, illustrating the implement interlock connection system in the first, locked position.
Figure 13:
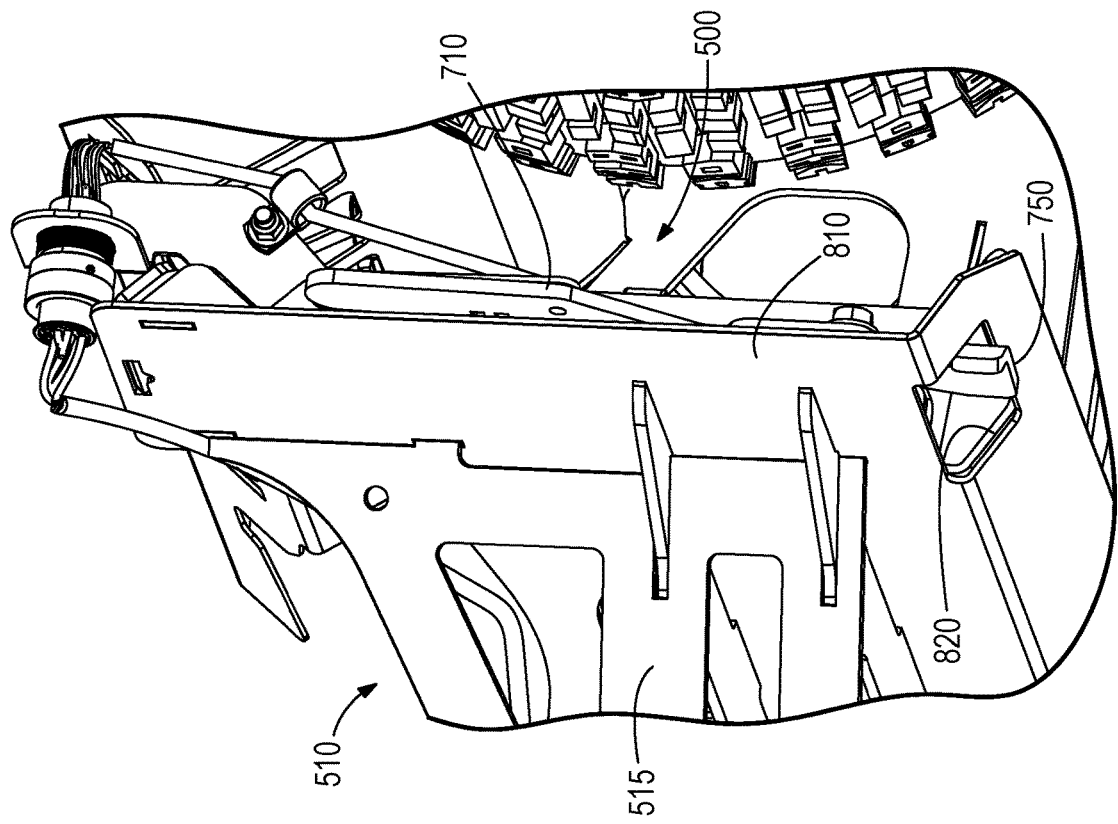
FIG. 13 is another isolated front perspective view of a portion of the stand-on snow removal vehicle of FIG. 6, illustrating the implement interlock connection system in the third, unlocked position.
Figure 14:
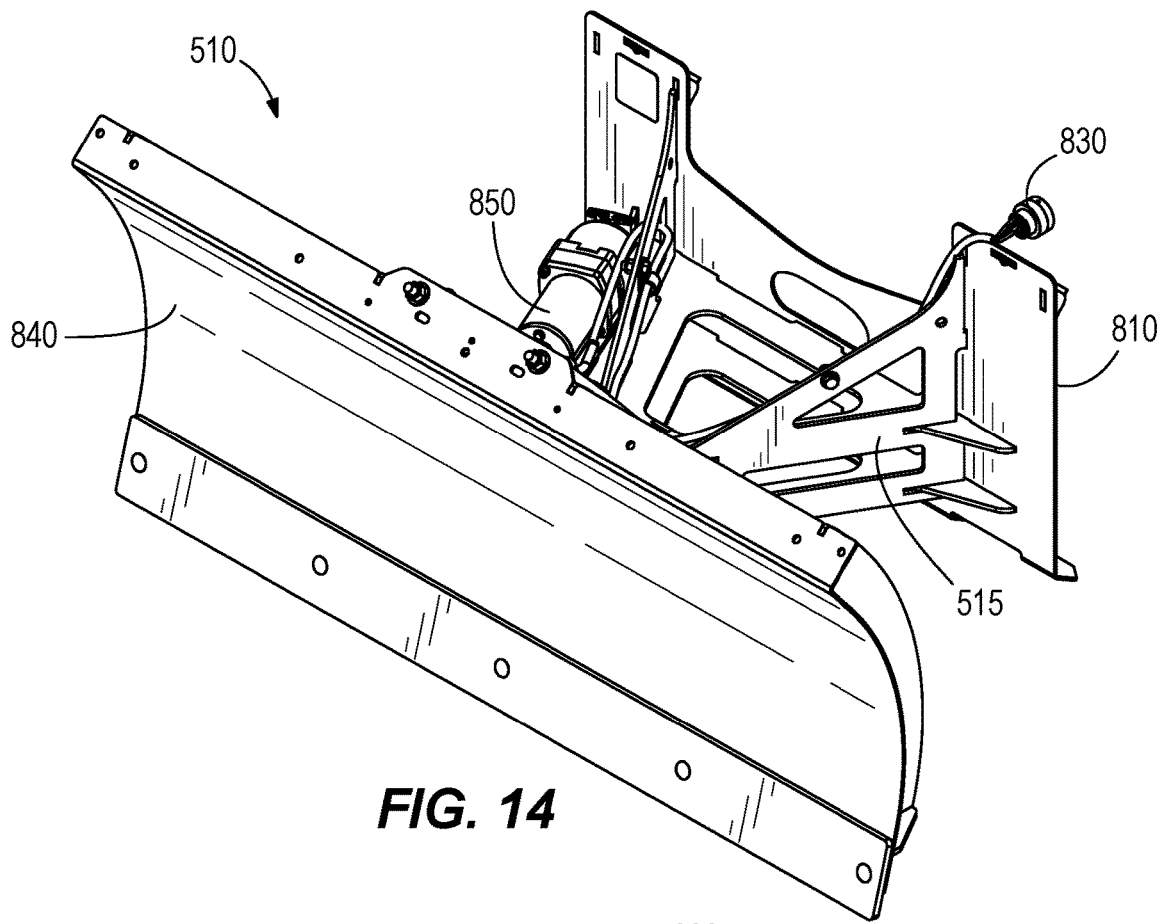
FIG. 14 is a perspective view of an implement, as it relates to one embodiment, for the stand-on snow removal vehicle of FIG. 1.
Figure 15:
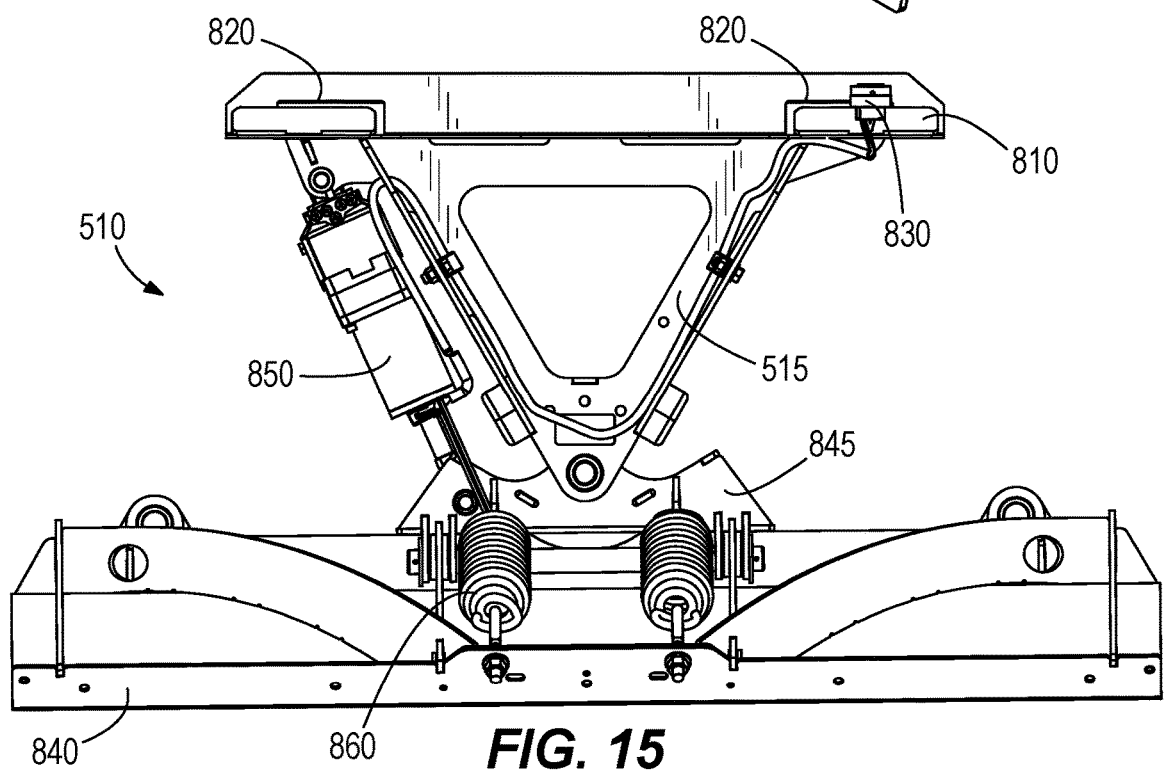
FIG. 15 is a top view of the implement of FIG. 14.
Figure 16:
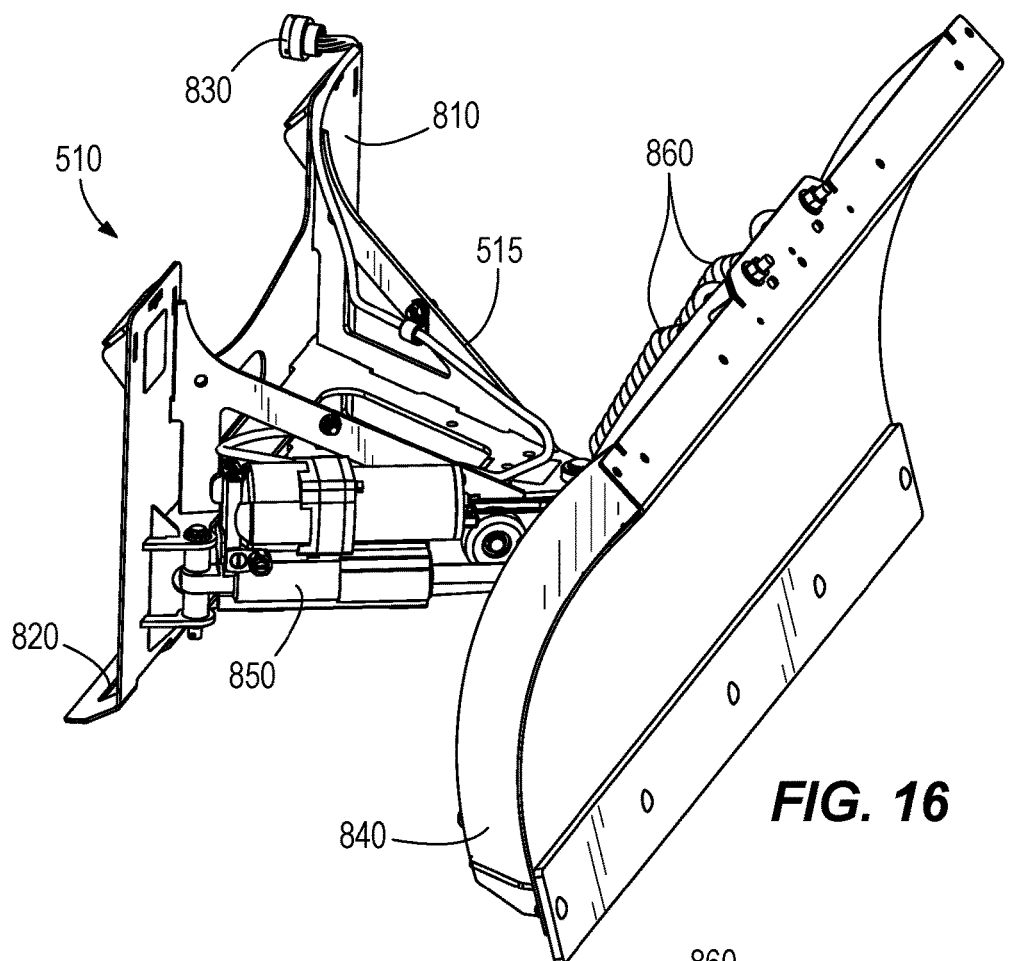
FIG. 16 is another perspective view of the implement of FIG. 14.
Figure 17:
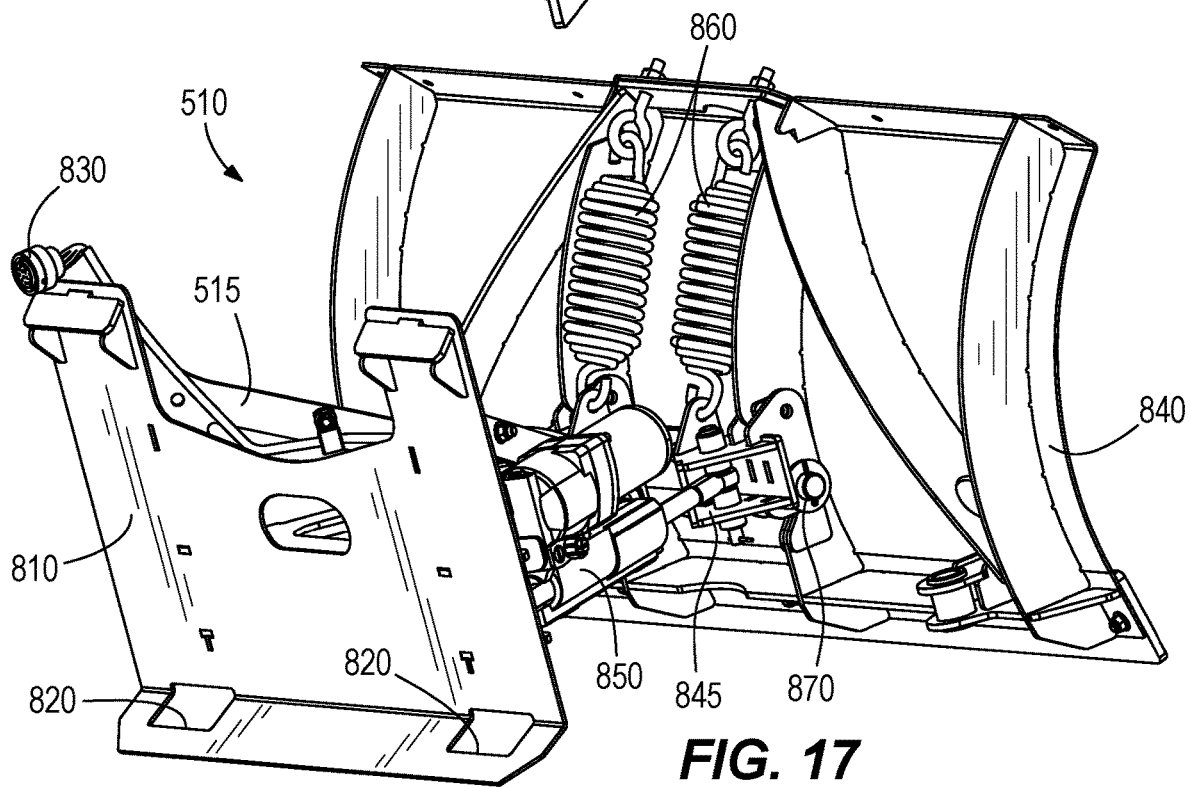
FIG. 17 is a rear perspective view of the implement of FIG. 14.

As illustrated in FIGS. 9-13, the implement 510 includes a securing interface 810 (FIGS. 12 and 13) that corresponds with and engages the implement interface 530. The securing interface 810 further includes an implement slot 820 (FIGS. 12 and 13). To secure the implement 510 to the implement support assembly 500, the securing interface 810 of the implement 510 is coupled to the implement interface 530 such that the first slot 730 is aligned with and overlaps the implement slot 820. The first lever 710 is then pivoted about the first pivot point 760 (i.e., from the position in FIG. 11) relative to the implement interface 530 such that the first lever protrusion 750 extends through the first slot 730 and the implement slot 820 (FIG. 10). When the first lever protrusion 750 engages the securing interface 810, the second lever 720 aligns with the second slot 740. When first lever 710 reaches the locked position (FIG. 9), the second lever protrusion 770 engages the second slot 740 so the implement interlock connection 700 is moved towards the locked position. In the locked position, the second lever protrusion 770 secures the first lever 710 such that the first lever 710 is prohibited from moving.

To unlock the implement interlock connection system 700 such that the implement 510 is removable from the implement support assembly 500, the second lever 720 is pivoted about the second pivot point 780 (i.e., to the position in FIG. 10). Specifically, the second lever protrusion 770 pivots out of engagement with the second slot 740. Once the second lever protrusion 770 has been removed from the second slot 740, the first lever 710 is no longer prohibited from moving. The first lever protrusion 750 may then be pivoted about the first lever pivot point 760 to remove the first lever protrusion 750 from the first slot 730 and the implement slot 820 (FIGS. 11 and 13). With both the first and second levers 710, 720 pivoted away from the corresponding first slot 730 and the second slot 740, the implement 510 may be removed from the implement support assembly 500.

Now with reference to FIGS. 14-17, an exemplary implement 510 is illustrated. In the illustrated embodiment, the implement 510 is a snowplow. In such embodiments, the snowplow includes a snowplow blade 840 coupled to the implement arm 515 opposite the securing interface 810. The implement interlock connection system 700 (FIGS. 9-12) is configured to secure the securing interface 810 to the implement interface 530. The implement 510 further includes a secondary hydraulic cylinder 850 positioned on the right side of the implement arm 515. The hydraulic cylinder 850 includes a first end coupled to the implement arm 515 and a second end coupled to the snowplow blade 840. In the illustrated embodiment, a bracket 845 is coupled between the snowplow blade 840 blade and the support arm 515 and the second end of the hydraulic cylinder 850 is coupled to the bracket 845. As such, it should be appreciated that the hydraulic cylinder 850 may be directly coupled to the snowplow blade 840 or coupled through the connection of the bracket 845.

The secondary hydraulic cylinder 850 is electrically connected to the electrical connector 560 (FIG. 5) via a second connector 830. As such the secondary hydraulic cylinder is configured to receive an input from the operator interface 200 to selectively adjust the position of the secondary hydraulic cylinder 850. In operation, the hydraulic cylinder 540 (FIG. 7) is configured to lift or lower the implement 510 in a vertical direction (i.e., pitch), and the secondary cylinder 850 is configured to adjust a yaw position of the snowplow blade. The implement 510 further includes a pair of biasing members 860 (FIG. 17) having a first end coupled to the snowplow blade 840 and a second end coupled to the bracket 845. The biasing member 860 allows the snowplow blade 840 to pivot about a trip axis 870 when the snowplow blade 840 engages an object (e.g., a crack or seam in the concrete, a rock, etc,).

Figure 18:
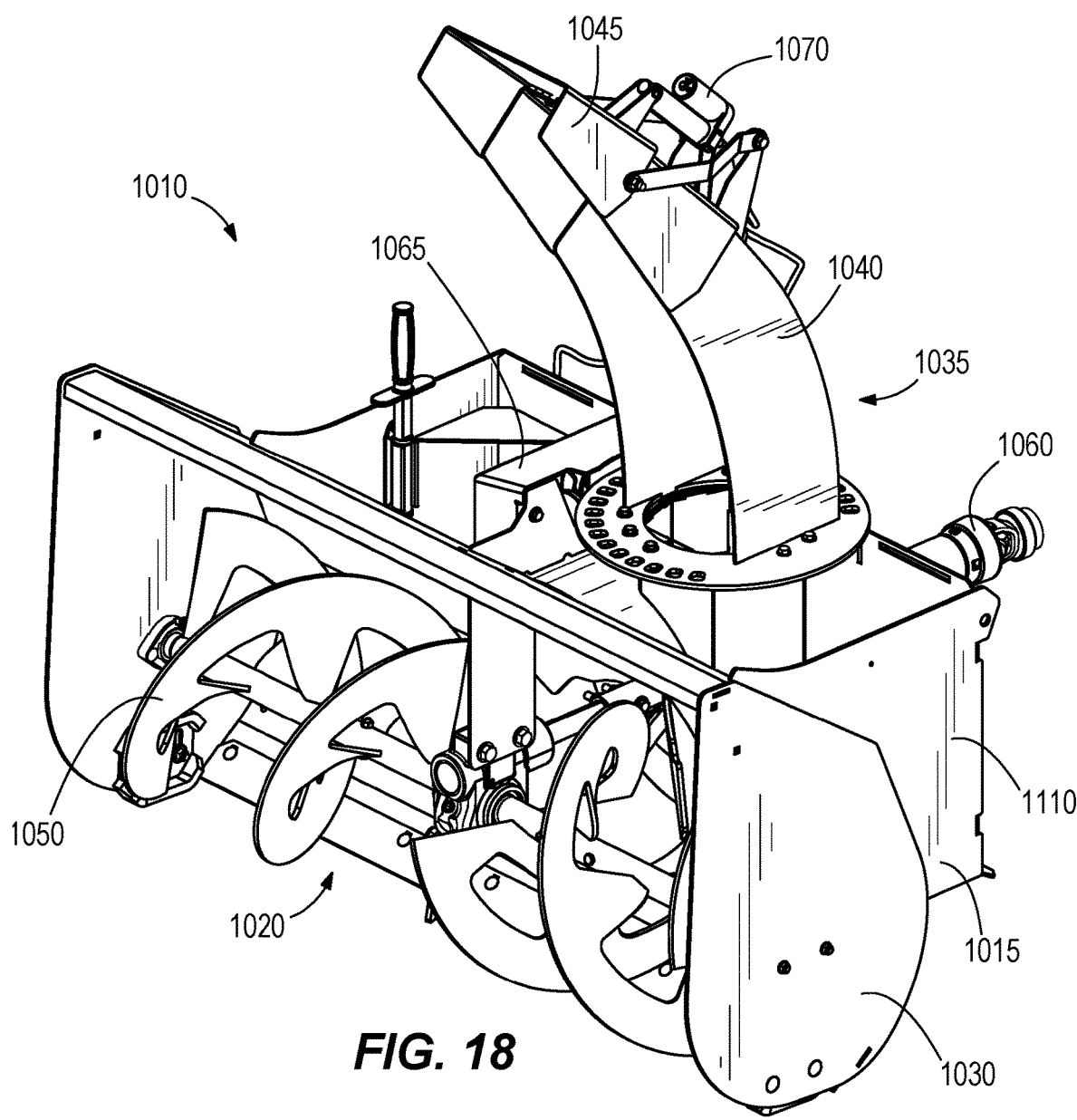
FIG. 18 is a perspective view of an implement, as it relates to another embodiment, for the stand-on snow removal vehicle of FIG. 1.
Figure 19:
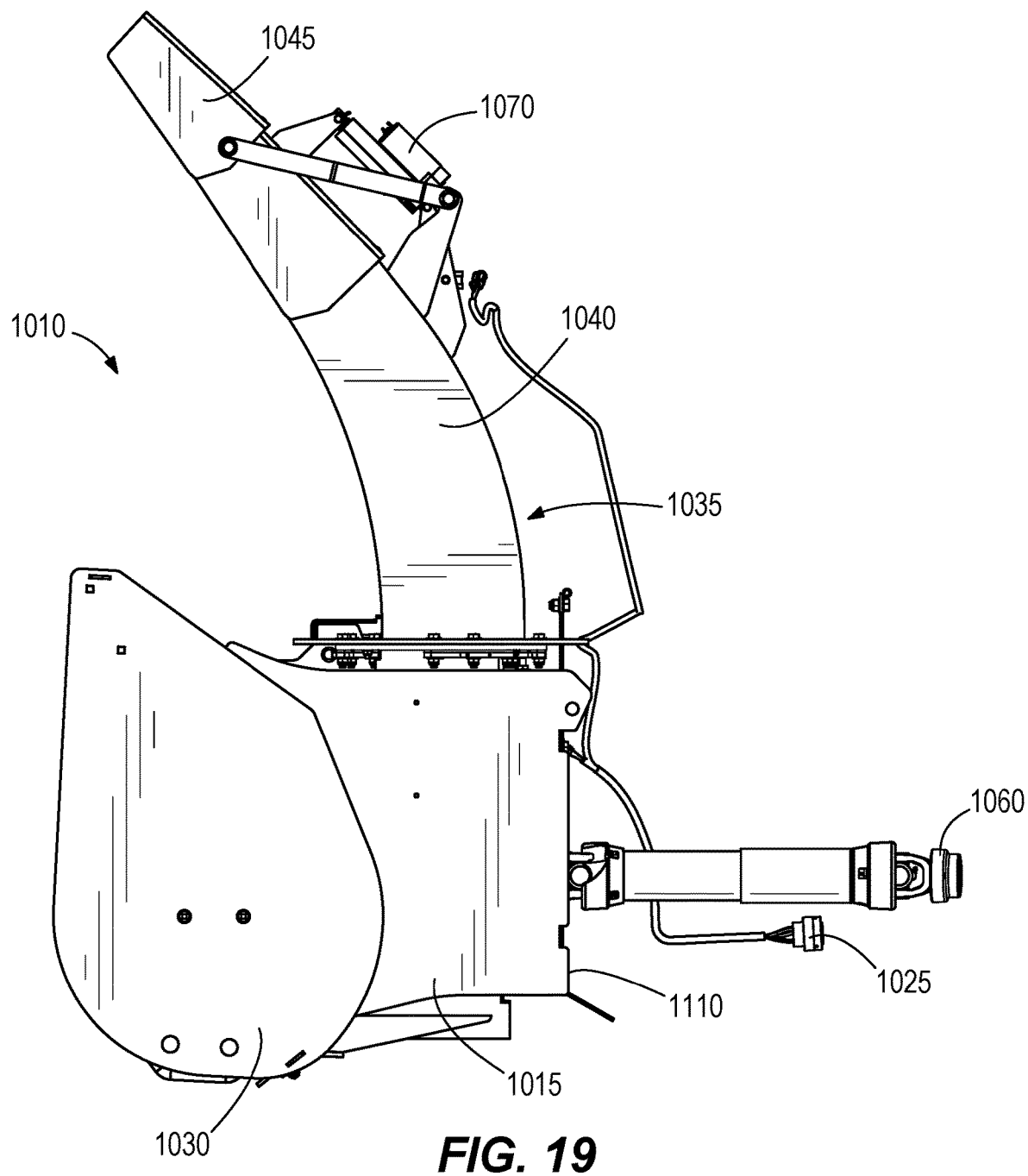
FIG. 19 is a side view of the implement of FIG. 18.
Figure 20:
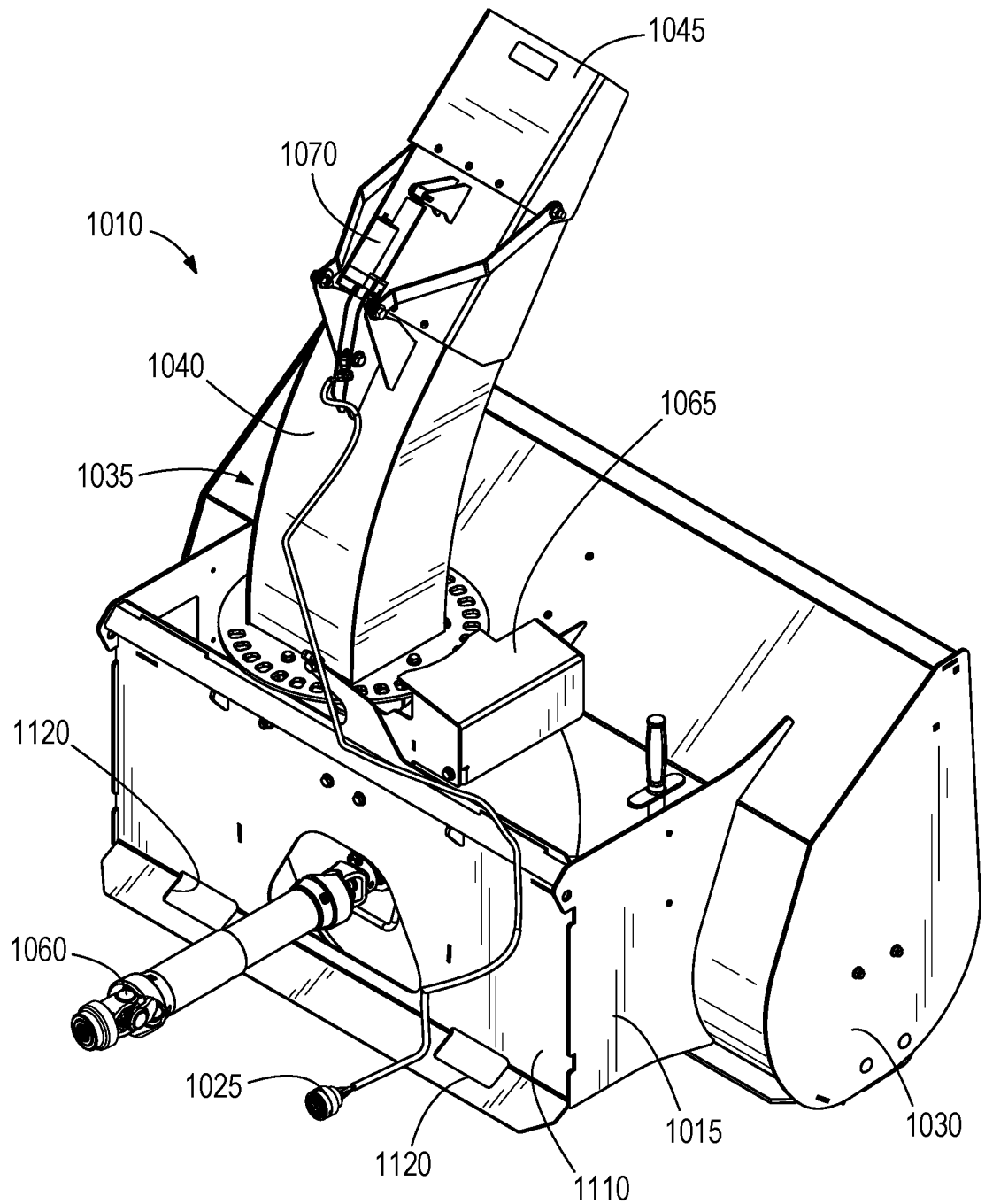
FIG. 20 is a rear perspective view of the implement of FIG. 18.

FIGS. 18-20 illustrate an implement 1010 according to another embodiment. The implement 1010 is a snow blower that includes a snow blower feed mechanism 1020, a housing 1030 defining an implement arm 1015, a securing interface 1110 defined on the implement arm 1015, a chute 1040 coupled to the implement arm 1015 and in communication with the feed mechanism 1020, and a snow blower chute adjustment mechanism 1035. The chute adjustment mechanism 1035 further includes a chute cap 1045 pivotably coupled to the chute 1040. The implement interlock connection system 700 (FIGS. 9-12) is configured to secure the securing interface 1110 to the implement interface 530 via implement slots 1120 (FIG. 20).

The snow blower feed mechanism 1020 includes a snow blower auger 1050. The chute adjustment mechanism 1035 is rotatably coupled to the housing 1030 and the feed mechanism 1020 is operably coupled to PTO shaft 56 (FIG. 4) via an implement work shaft 1060 to selectively drive the feed mechanism 1020. In the illustrated embodiment, the chute adjustment mechanism 1035 comprises an electric chute motor 1065 and an electric cap motor 1070. The chute motor 1065 and cap motor 1070 are electrically connected to the electrical connector 560 (FIG. 5) via a second connector 1025 such that the chute motor 1065 and cap motor 1070 have electrical power. As such, the chute adjustment mechanism 1035 is configured to receive an input from the operator interface 200 to selectively adjust the positions of the chute 1040 (about a vertical axis) and cap (about a horizontal axis) to blow snow in a desired direction and trajectory.

Figure 21:
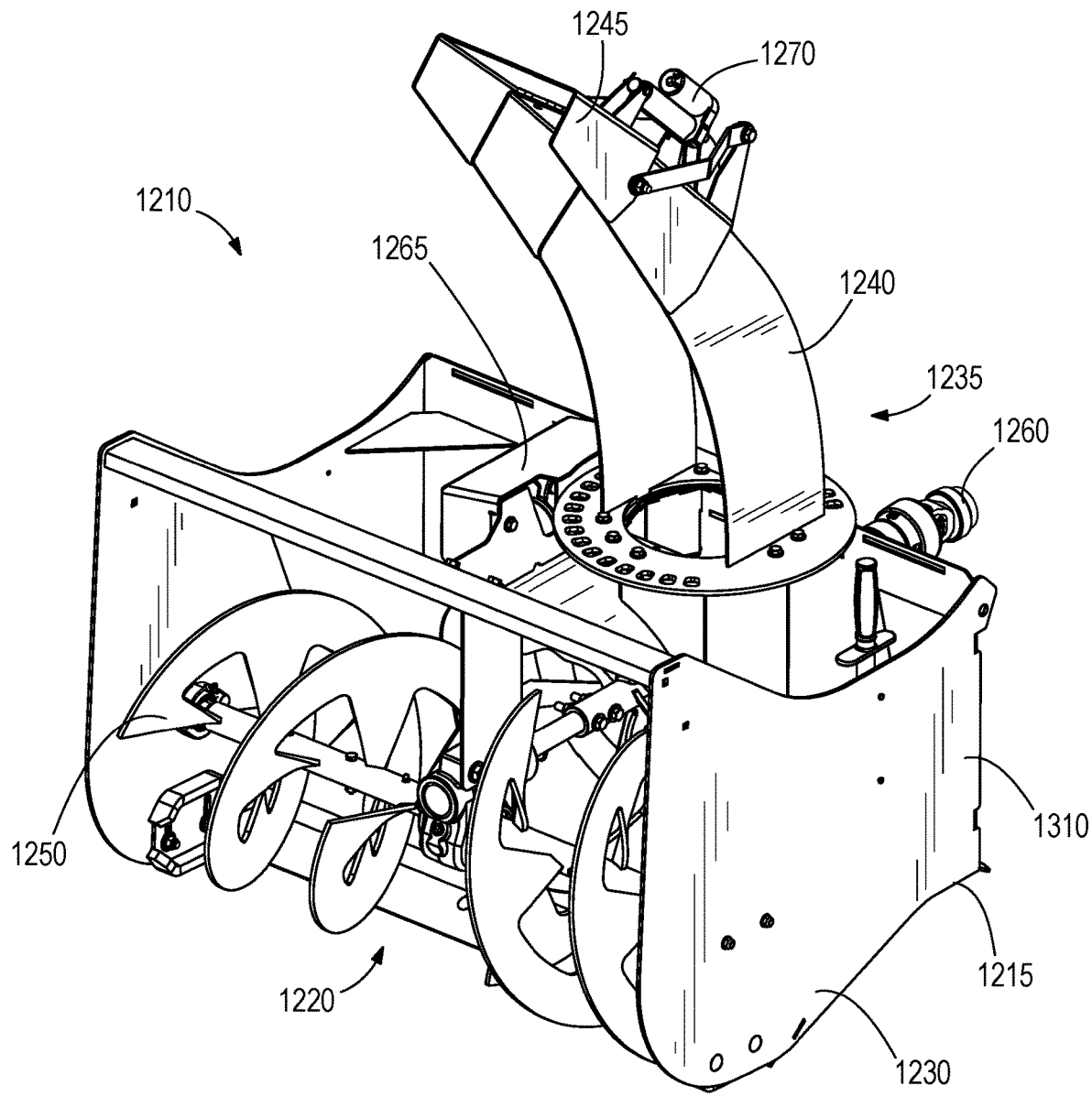
FIG. 21 is a perspective view of an implement, as it relates to another embodiment, for the stand-on snow removal vehicle of FIG. 1.
Figure 22:
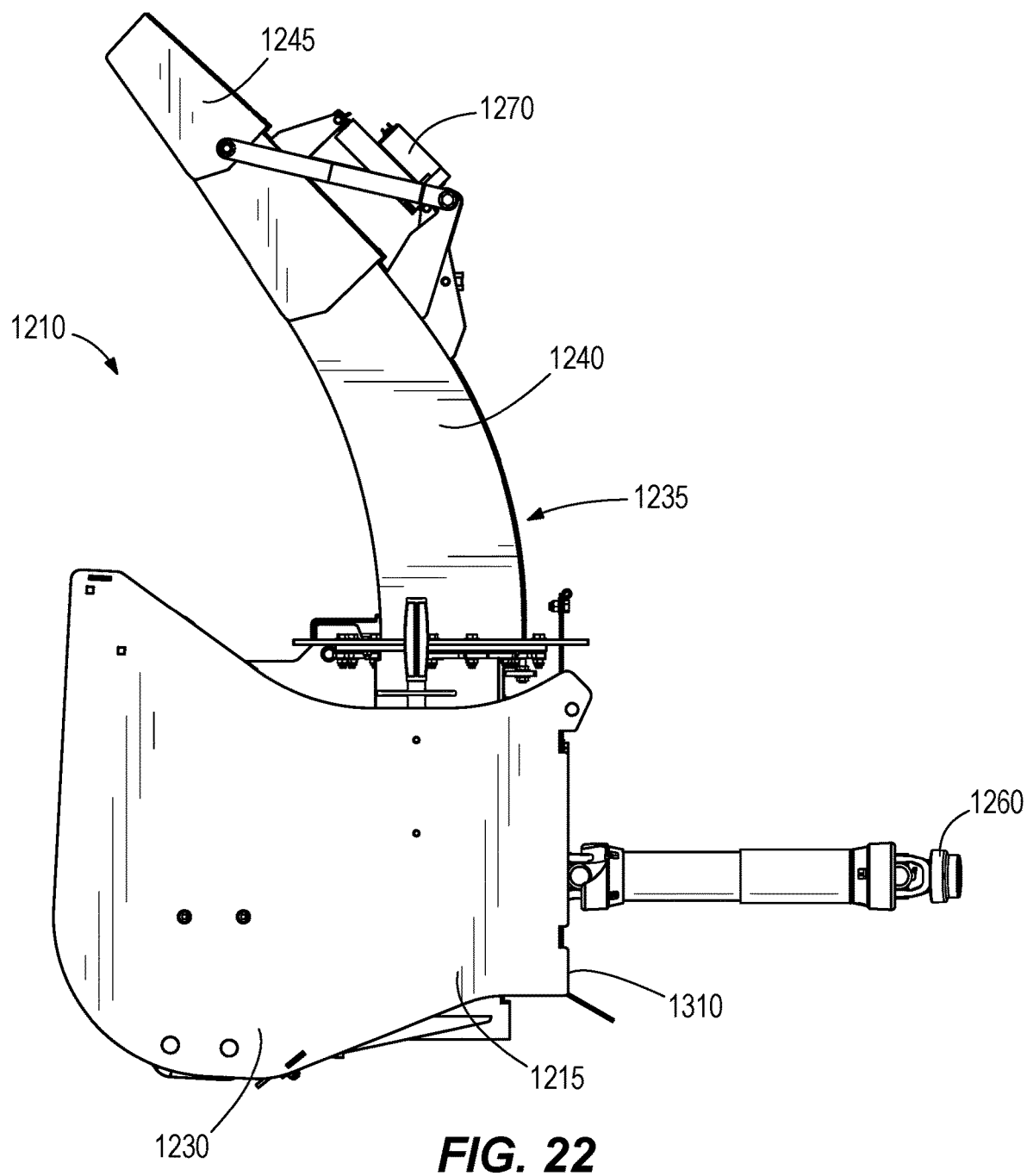
FIG. 22 is a side view of the implement of FIG. 21.
Figure 23:
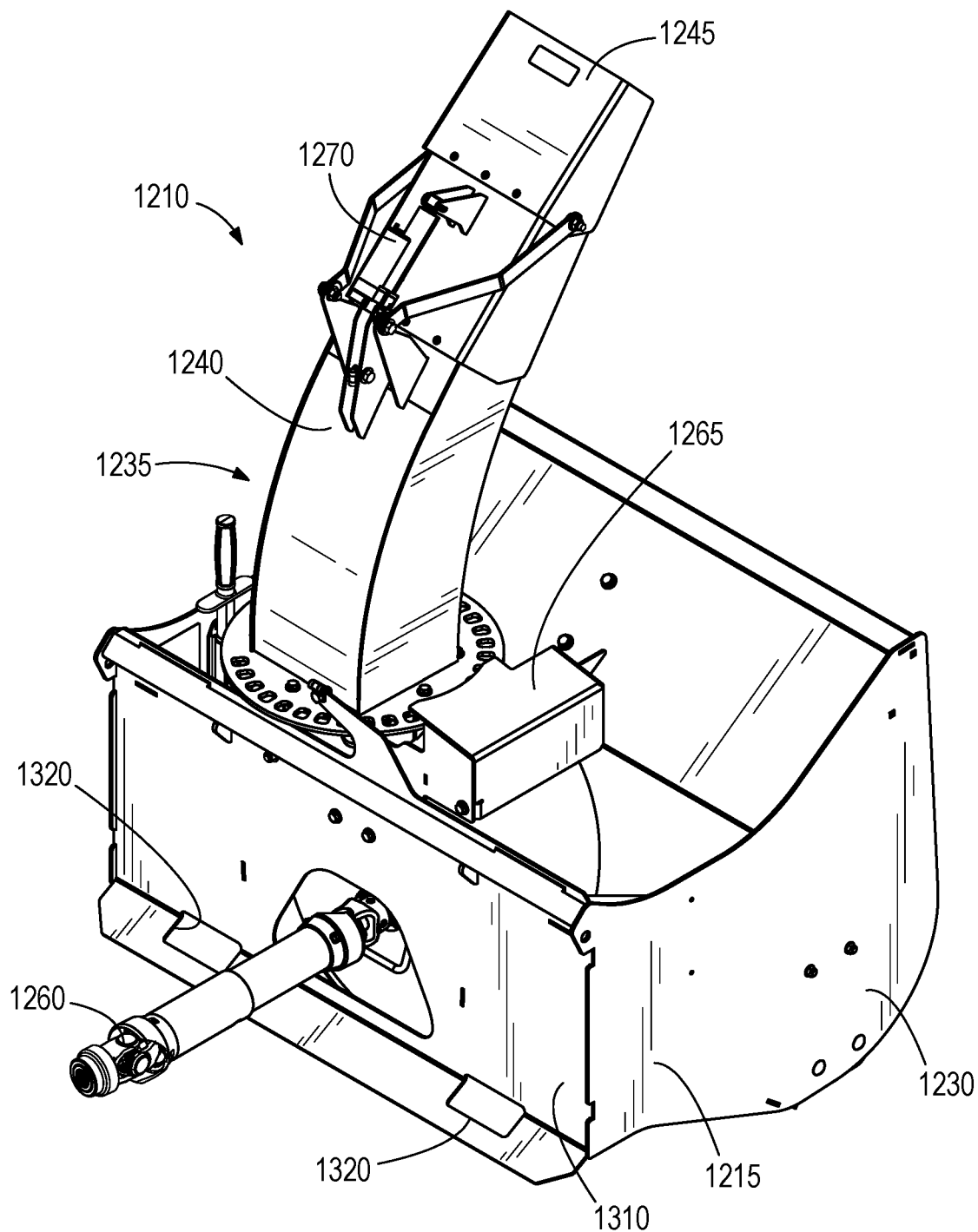
FIG. 23 is a rear perspective view of the implement of FIG. 21.
Figure 24:
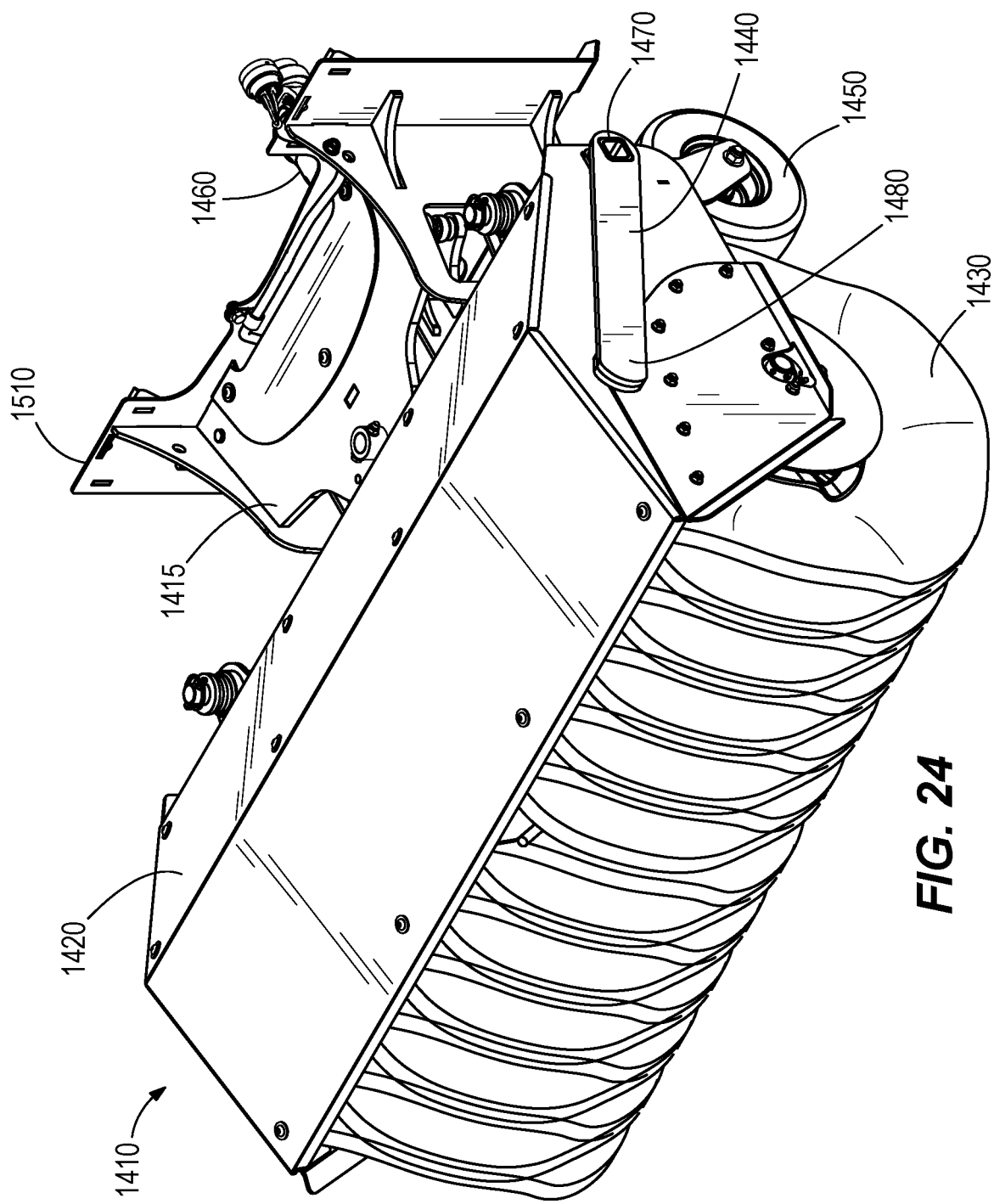
FIG. 24 is a front, perspective view of an implement, as it relates to another embodiment, for the stand-on snow removal vehicle of FIG. 1.
Figure 25:
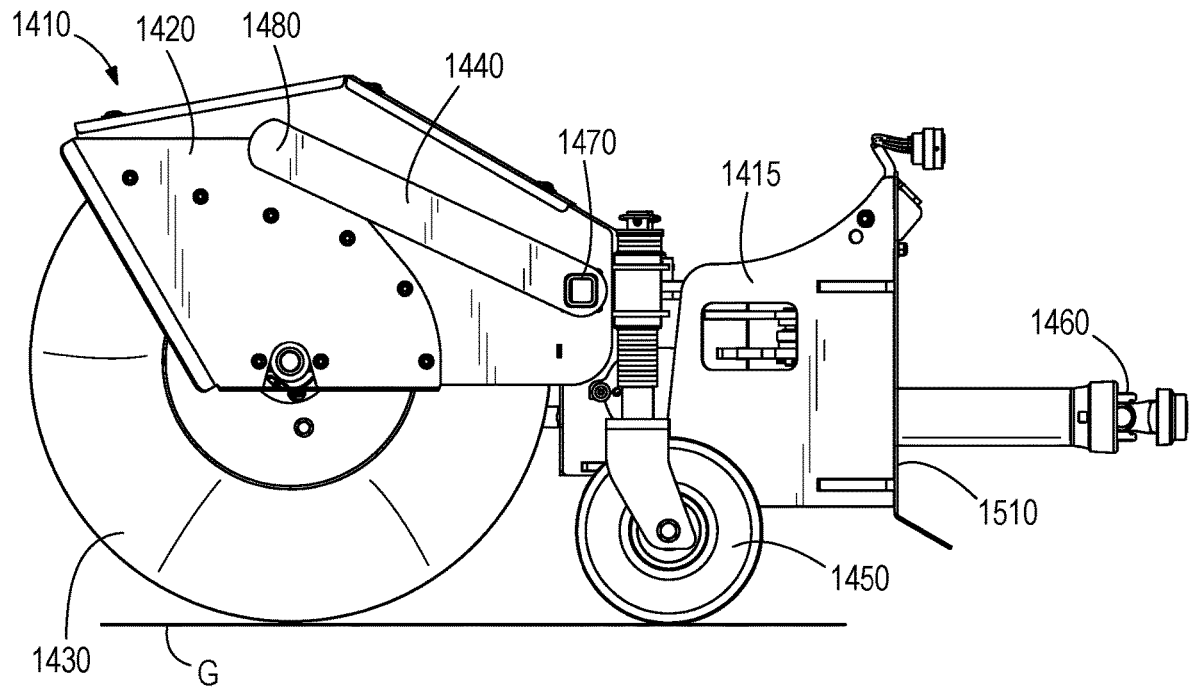
FIG. 25 is a left side view of the implement of FIG. 24.
Figure 26:
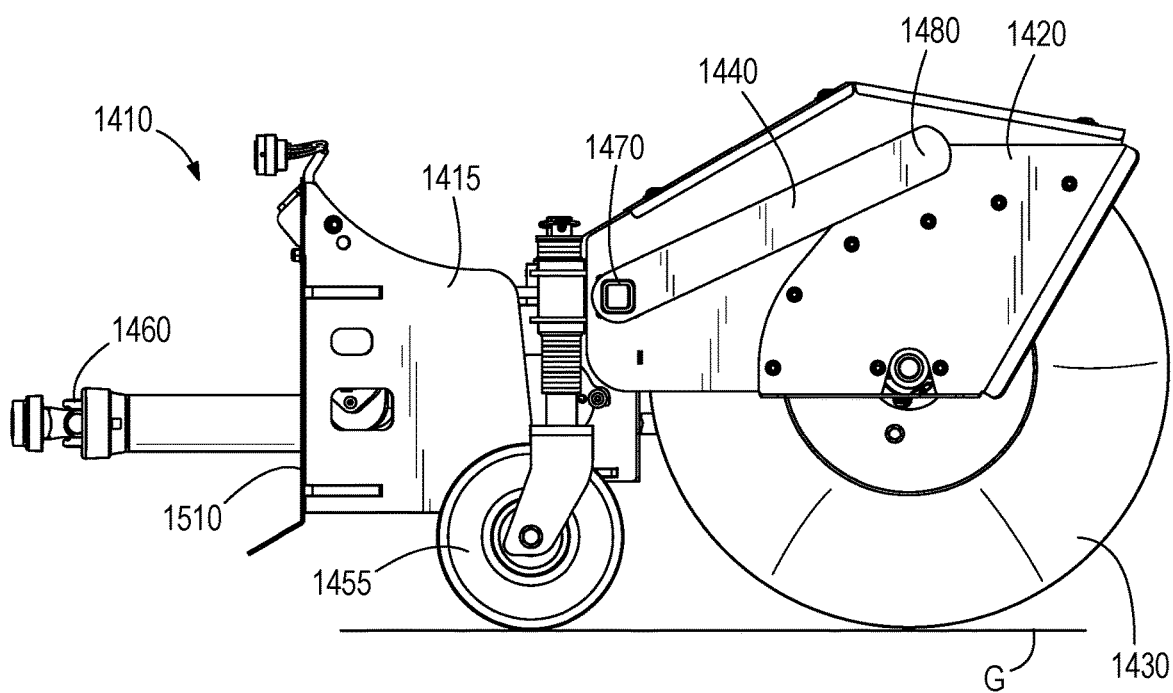
FIG. 26 is right side view of the implement of FIG. 24.

In other embodiments as shown in FIGS. 21-23, an implement 1210 includes a feed mechanism 1220 having a width that is roughly equivalent to the width of an implement arm 1215. For the sake of brevity, the components of the implement 1210 that are like the components of the implement 1020 are numbered with like reference numbers plus "200" and are not described in detail below.

Now with reference to FIGS. 24-29, an implement 1410 according to another embodiment is illustrated. In the illustrated embodiment, the implement 1410 is a powered brushroll. In such embodiments, the implement 1410 includes an implement arm 1415, a securing interface 1510 defined on the implement arm 1415, an implement frame 1420 coupled to the implement arm 1415, and an implement work member or brush 1430 rotatably coupled to the implement frame 1420. The implement interlock connection system 700 (FIGS. 9-12) is configured to secure the securing interface 1510 to the implement interface 530.

Figure 27:
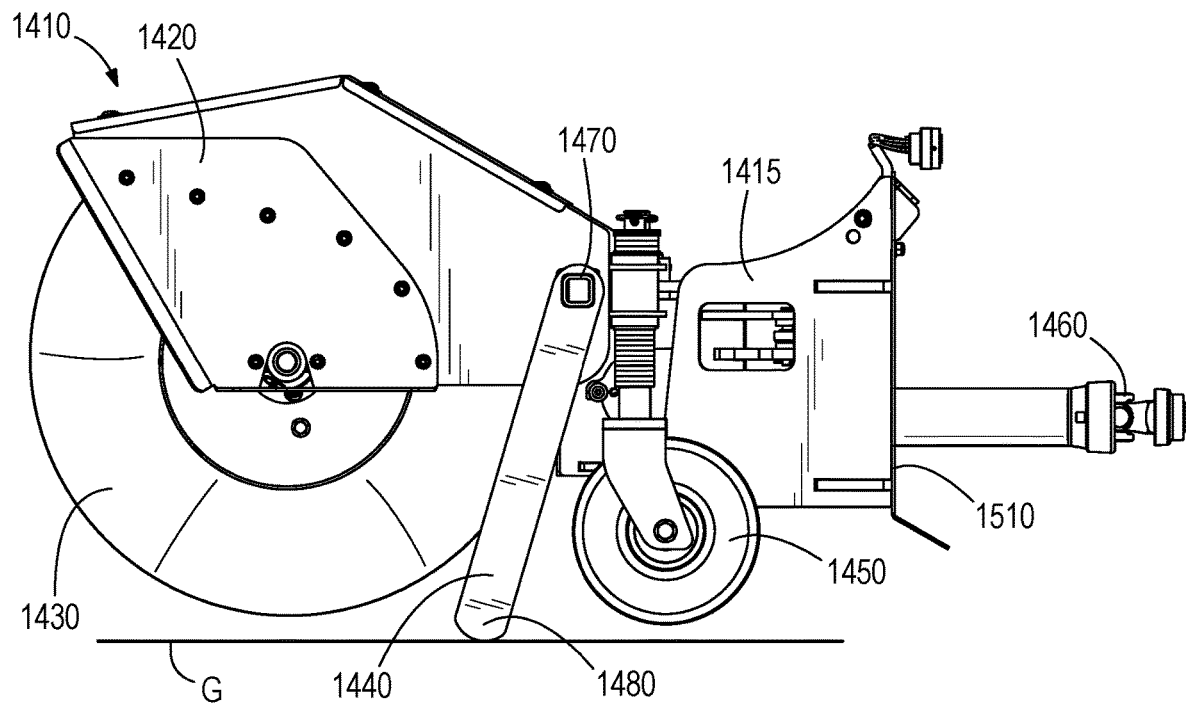
FIG. 27 is another left side view of the implement of FIG. 24, illustrating a prop in a storage or deployed position.
Figure 28:
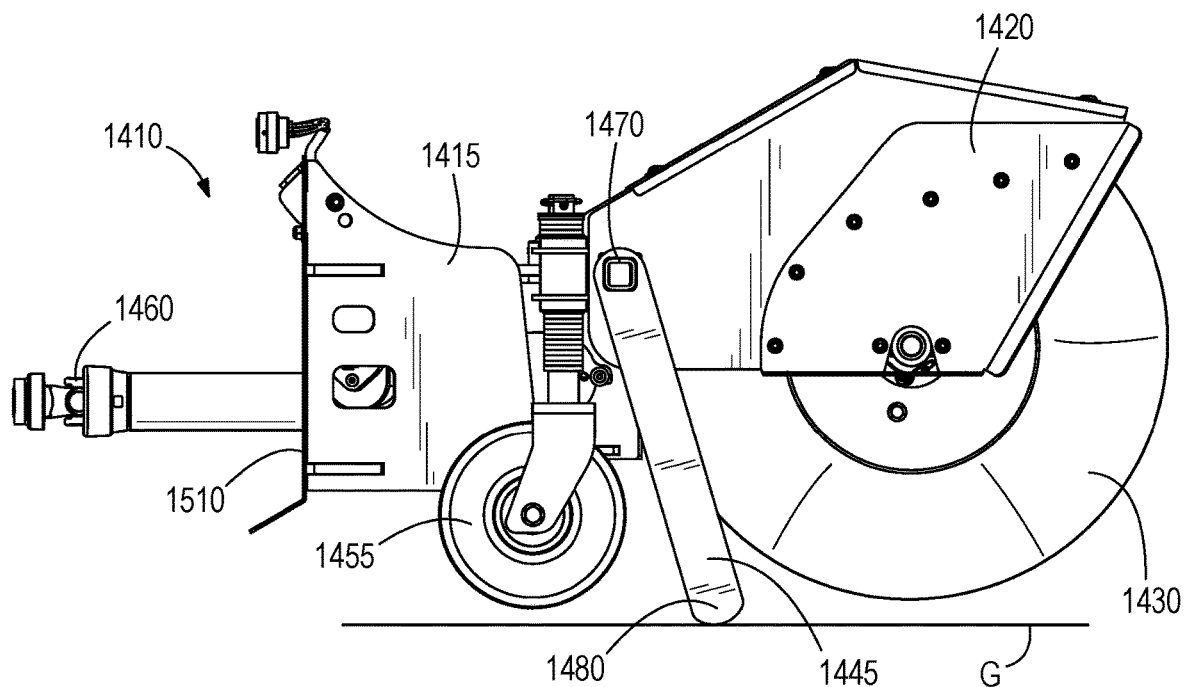
FIG. 28 is another right side view of the implement of FIG. 24 illustrating a prop in a storage or deployed position.
Figure 29:
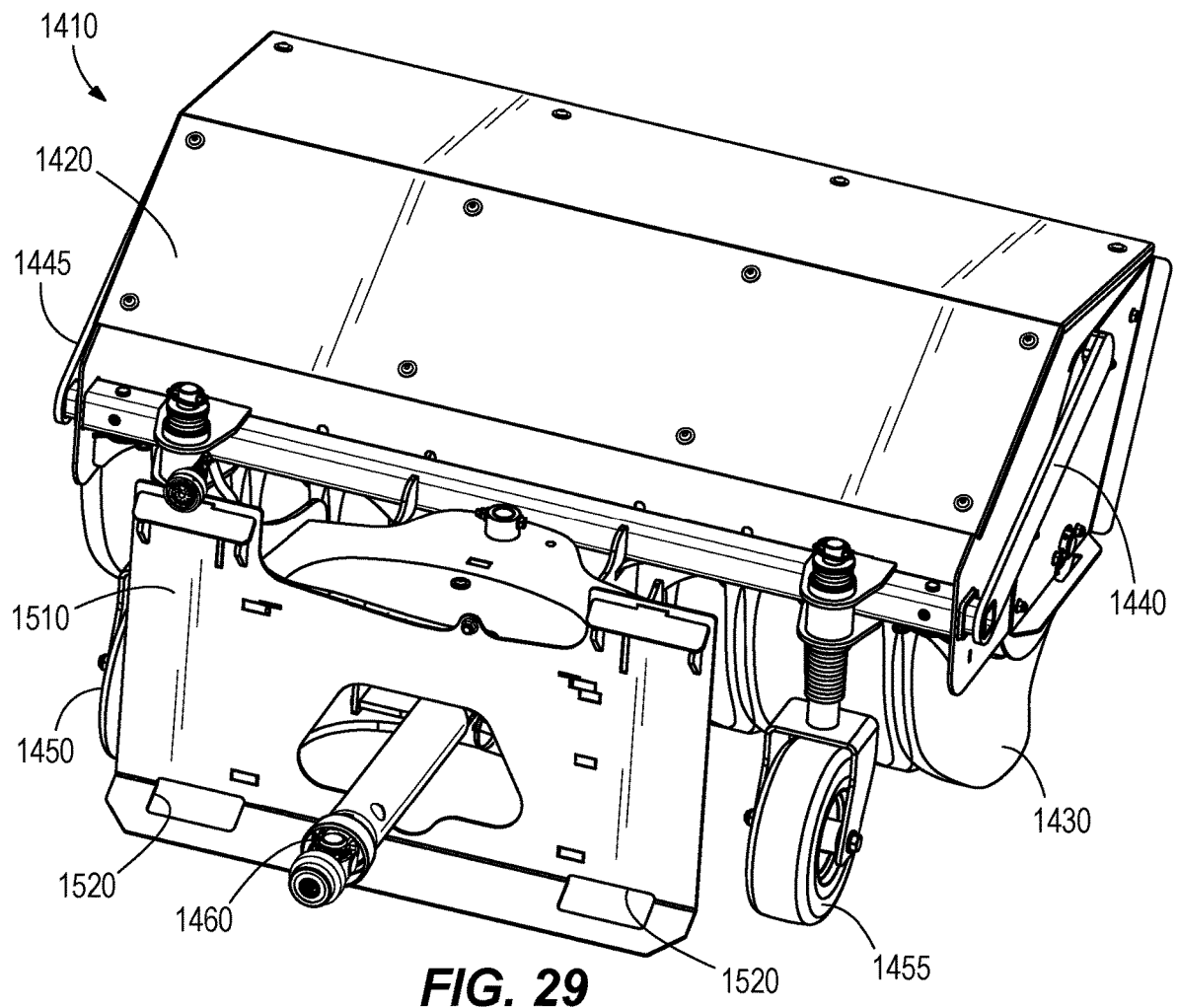
FIG. 29 is a rear perspective view of the implement of FIG. 24.
Figure 30:
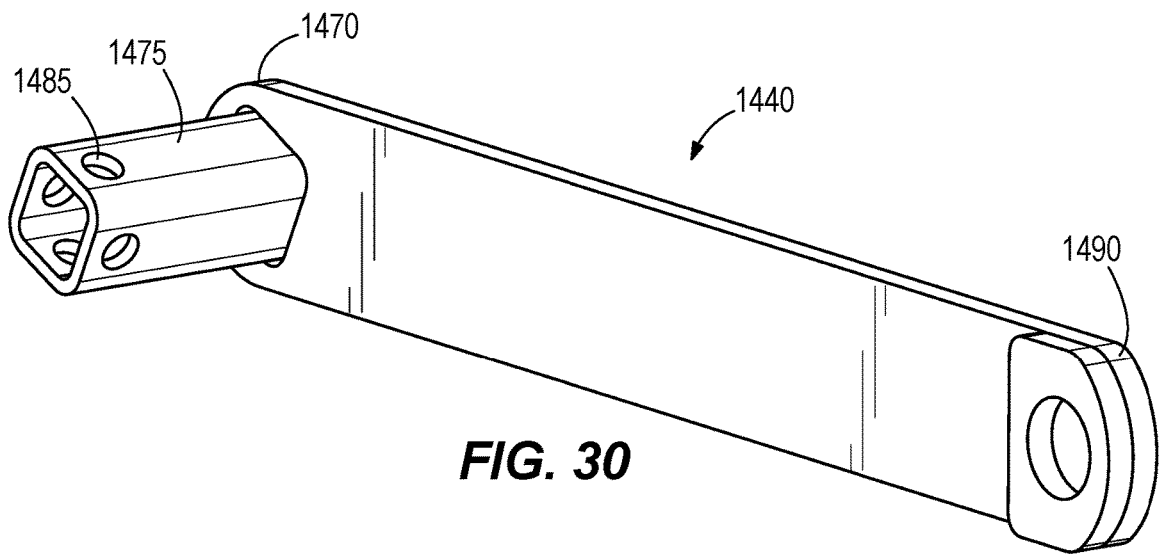
FIG. 30 is a perspective view of the prop.

The implement 1410 further includes a storage prop 1440, 1445 (i.e., a left storage prop 1440 and a right storage prop 1445) coupled to each side (e.g., the left and right sides) of the implement frame 1420, ground engaging elements 1450, 1455 (i.e., a left support wheel 1450 and a right support wheel 1455) coupled to the implement frame 1420, and an implement work shaft 1460 operably coupled to the brush 1430 and the PTO shaft 56 (FIG. 4) to selectively drive the brush 1430. In the illustrated embodiment, each storage prop 1440, 1445 includes a first prop end 1470 that is pivotably coupled to the implement frame 1420 (e.g., through a square interface) and a second prop end 1480 opposite the first prop end 1470. As illustrated in FIG. 30, the first prop end 1470 includes a connection member 1475 (e.g., having a square interface) that is selectively received within the implement frame 1420. The connection member 1475 further includes a plurality of apertures 1485 that align with apertures formed in the implement frame 1420 (FIG. 29) to receive a pin that secures the prop 1440 in a stowed position (FIGS. 25 and 26) or a storage position (FIGS. 27 and 28). In the illustrated embodiment, the square interface of the connection member the prop 1440 requires the prop 1440 to be uncoupled from the implement frame 1420 and recoupled to the implement frame 1420 to move the prop 1440 between the stowed and storage position. In other embodiments, the connection member 1475 may have a circular interface such that the prop 1440 can be moved between the stowed and storage position without uncoupling the prop 1440 from the implement frame. As such, it should be appreciated that first prop end 1470 is pivotally coupled to the implement frame 1420 in either embodiment.

The prop 1440 is movable from a stowed position (FIGS. 25 and 26) to a storage position (FIGS. 27 and 28) in which the second prop end 1480 engages the ground G and the implement 1410 pivots rearward such that the weight of the implement 1410 is carried by the props 1440, 1445 and ground engaging elements 1450, 1455. In the storage position, the brush 1430 is lifted off the ground G. Lifting the brush 1430 from the ground into the storage position prevents prolonged engagement between brush bristles of the brush 1430 and the ground G. As such, the storage props 1440, 1445 inhibits the bristles of the brush from weakening and deformity in the storage position. In other words, the storage props 1440, 1445 bear at least a portion of the weight of the implement 1410 in place of the brush. Further, the storage props 1440, 1445 are configured to cooperatively bear the entire weight of the implement 1410 with the wheels 1450, 1455.

In the stowed position, the first prop end 1470 is rotated such that the second prop end 1480 is positioned above a bottom edge of the brush 1430 on the right side and left side of the implement frame 1420. In other words, in the stowed position, the storage props are inhibited from interfering with operation of the brush 1430. During operation of the vehicle 10, the wheels 1450, 1455 guide movement of the implement 1410. The implement 1410 is configured to receive an input from the operator interface 200 to activate the PTO shaft 56 (FIG. 4), which drives rotation of the brush 1430 through connection with the implement work shaft 1460. In addition, the brush 1430 is configured to bear a portion of the weight of the implement 1410 in operation.

The storage props 1440, 1445 may also be used to align the securing interface 1510 of the implement 1410 with the implement interface 530 when the implement is being attached to the vehicle 10. More specifically, storage props 1440, 1445 orient the implement arm 1415 roughly perpendicular to the ground so the implement slot 1520 of the securing interface 1510 can be aligned with the first slot 730 of the implement interlock connection system 700 (FIGS. 9-13). In other words, in the absence of the storage props 1440, 1445, the implement interface 530 would be oriented non-perpendicularly with the ground.

What is claimed:

1. An implement interlock connection system for connecting an implement to a utility vehicle, the utility vehicle including an implement interface having a first slot forming in the implement interface at a first position and a second slot formed in the implement interface at a second position spaced from the first position, and the implement including an implement arm having a securing interface with an implement slot defined therein, the implement interlock connection system comprising:
    a first lever pivotably coupled to the implement interface, the first lever being configured to selectively engage the first slot; and
    a second lever pivotably coupled to the first lever, the second lever being configured to selectively engage the second slot;
    wherein the implement is secured to the implement interface of the utility vehicle when the first lever engages the first slot and the second lever engages the second slot,
    wherein the second lever engages the second slot to prohibit movement of the first lever.

2. The implement interlock connection system of claim 1, wherein the first slot is configured to overlap and align with the implement slot so the first lever extends through the first slot and the implement slot.

3. The implement interlock connection system of claim 1, wherein a biasing member is positioned between the first and second levers which biases the second lever into engagement with the second slot.

4. The implement interlock connection system of claim 1, wherein
    the first position that the first slot is formed is in a bottom surface of the implement interface, and
    the second position that the second slot is formed is in a vertical structure of the implement interface.

5. The implement interlock connection system of claim 1, wherein the second lever is configured to pivot with the first lever when the second lever is disengaged from the second slot.

6. The implement interlock connection system of claim 1, wherein the first lever includes a first protrusion rotatably received in the first slot, and the second lever includes a second protrusion rotatably received in the second slot.

* * * * *